(12) United States Patent
Pavani et al.

(10) Patent No.: US 9,357,202 B2
(45) Date of Patent: May 31, 2016

(54) HIGH RESOLUTION IMAGING DEVICES WITH WIDE FIELD AND EXTENDED FOCUS

(75) Inventors: Sri Rama Prasanna Pavani, Santa Clara, CA (US); Changhuei Yang, Pasadena, CA (US); Jigang Wu, Irvine, CA (US)

(73) Assignee: California Institute of Technology, Pasadena, CA (US)

( * ) Notice: Subject to any disclaimer, the term of this patent is extended or adjusted under 35 U.S.C. 154(b) by 945 days.

(21) Appl. No.: 13/032,529

(22) Filed: Feb. 22, 2011

(65) Prior Publication Data

US 2011/0205352 A1  Aug. 25, 2011

Related U.S. Application Data

(60) Provisional application No. 61/307,324, filed on Feb. 23, 2010, provisional application No. 61/307,328, filed on Feb. 23, 2010.

(51) Int. Cl.
| | |
|---|---|
| *H04N 9/47* | (2006.01) |
| *H04N 13/02* | (2006.01) |
| *G02B 21/16* | (2006.01) |

(Continued)

(52) U.S. Cl.
CPC ............ *H04N 13/0207* (2013.01); *G02B 21/16* (2013.01); *G02B 21/361* (2013.01); *G02B 27/2242* (2013.01); *G02B 27/2285* (2013.01);

(Continued)

(58) Field of Classification Search
USPC ............................ 348/80, E07.085, 67, 68, 79
See application file for complete search history.

(56) References Cited

U.S. PATENT DOCUMENTS

| | | | |
|---|---|---|---|
| 4,165,464 A | 8/1979 | Ikeda et al. | |
| 4,580,151 A | 4/1986 | Bamba | |

(Continued)

FOREIGN PATENT DOCUMENTS

| | | |
|---|---|---|
| EP | 1371965 | 12/2003 |
| JP | 80-015156 | 1/1996 |

(Continued)

OTHER PUBLICATIONS (López-Mariscal et al.) López-Mariscal, Carlos, and Julio C. Gutiérrez-Vega. "The generation of nondiffracting beams using inexpensive computer-generated holograms." American Journal of Physics 75.1 ( Jan. 1, 2007): 36-42.*

(Continued)

*Primary Examiner* — Christopher S Kelley
*Assistant Examiner* — Ana Picon-Feliciano
(74) *Attorney, Agent, or Firm* — Sheila Martinez-Lemke; Weaver Austin Villeneuve & Sampson LLP

(57) ABSTRACT

Embodiments of the present invention relate to a high-resolution imaging device with wide field and extended focus comprising a beam generator for generating a plurality of nondiffracting beams and a scanning mechanism for moving the plurality of nondiffracting beams relative to the object to illuminate a volume of the object. The high-resolution imaging device also comprises surface element and a body having a light detector layer outside the surface element. The light detector layer has a light detector configured to measure light data associated with the plurality of nondiffracting beams illuminating the volume of the object. In some cases, the high-resolution imaging device also includes a lens inside of the light detector layer. The lens is configured to focus the light on the light detector surface.

22 Claims, 8 Drawing Sheets

(51) Int. Cl.
G02B 21/36 (2006.01)
G02B 27/22 (2006.01)

(52) U.S. Cl.
CPC ....... *H04N 13/0221* (2013.01); *H04N 13/0253* (2013.01)

(56) References Cited

U.S. PATENT DOCUMENTS

| | | | |
|---|---|---|---|
| 4,981,362 A | 1/1991 | DeJong et al. | |
| 5,384,573 A | 1/1995 | Turpin | |
| 5,583,342 A | 12/1996 | Ichie et al. | |
| 5,587,832 A | 12/1996 | Krause | |
| 5,795,755 A | 8/1998 | Lemelson | |
| 5,796,112 A * | 8/1998 | Ichie | 250/458.1 |
| 5,936,764 A | 8/1999 | Kobayashi | |
| 5,973,316 A | 10/1999 | Ebbesen et al. | |
| 6,133,986 A | 10/2000 | Johnson | |
| 6,219,441 B1 | 4/2001 | Hu | |
| 6,248,988 B1 | 6/2001 | Krantz | |
| 6,525,815 B2 | 2/2003 | Kung et al. | |
| 6,628,385 B1 * | 9/2003 | Osipchuk et al. | 356/318 |
| 6,636,300 B2 | 10/2003 | Doemens et al. | |
| 6,646,773 B2 | 11/2003 | Garner | |
| 6,731,391 B1 | 5/2004 | Kao et al. | |
| 6,865,246 B2 | 3/2005 | Yang | |
| 7,045,781 B2 | 5/2006 | Adamec et al. | |
| 7,057,806 B2 * | 6/2006 | Atkinson | 359/368 |
| 7,209,287 B2 | 4/2007 | Lauer | |
| 7,235,777 B2 * | 6/2007 | Hecht | 250/234 |
| 7,250,598 B2 | 7/2007 | Hollingsworth et al. | |
| 7,310,150 B2 | 12/2007 | Guillermo et al. | |
| 7,358,478 B2 * | 4/2008 | Price | 250/216 |
| 7,400,436 B2 | 7/2008 | Hendriks et al. | |
| 7,468,507 B2 | 12/2008 | Rogers et al. | |
| 7,477,380 B2 * | 1/2009 | Knebel et al. | 356/326 |
| 7,567,346 B2 * | 7/2009 | Fomitchov et al. | 356/416 |
| 7,576,862 B2 * | 8/2009 | Cromwell et al. | 356/445 |
| 7,641,856 B2 | 1/2010 | Padmanabhan et al. | |
| 7,642,536 B2 * | 1/2010 | Baer | 250/584 |
| 7,751,048 B2 | 7/2010 | Yang et al. | |
| 7,768,654 B2 | 8/2010 | Cui et al. | |
| 7,773,227 B2 | 8/2010 | Yang et al. | |
| 7,982,883 B2 | 7/2011 | Cui et al. | |
| 8,039,776 B2 | 10/2011 | Cui et al. | |
| 8,189,204 B2 | 5/2012 | Cui et al. | |
| 8,767,216 B2 | 7/2014 | Yang et al. | |
| 8,855,265 B2 | 10/2014 | Engel et al. | |
| 8,946,619 B2 | 2/2015 | Wu et al. | |
| 8,970,671 B2 | 3/2015 | Parvani et al. | |
| 9,046,680 B2 | 6/2015 | Cui et al. | |
| 9,086,536 B2 | 7/2015 | Pang et al. | |
| 2002/0159047 A1 | 10/2002 | Dubois | |
| 2003/0203502 A1 | 10/2003 | Zenhausern et al. | |
| 2003/0218756 A1 * | 11/2003 | Chen et al. | 356/497 |
| 2005/0162440 A1 | 7/2005 | Kleen | |
| 2005/0190376 A1 | 9/2005 | Wegmann et al. | |
| 2005/0271548 A1 | 12/2005 | Yang et al. | |
| 2005/0286101 A1 | 12/2005 | Garner et al. | |
| 2006/0152780 A1 | 7/2006 | Klug et al. | |
| 2007/0086020 A1 | 4/2007 | Han et al. | |
| 2007/0109619 A1 | 5/2007 | Eberl et al. | |
| 2007/0109633 A1 | 5/2007 | Stelzer | |
| 2007/0207061 A1 * | 9/2007 | Yang et al. | 422/82.05 |
| 2007/0245363 A1 | 10/2007 | Bakker et al. | |
| 2007/0258096 A1 | 11/2007 | Cui et al. | |
| 2007/0277192 A1 | 11/2007 | Hendriks et al. | |
| 2008/0008939 A1 | 1/2008 | Klug et al. | |
| 2008/0049234 A1 | 2/2008 | Seitz | |
| 2008/0100892 A1 | 5/2008 | Hendriks et al. | |
| 2008/0121790 A1 * | 5/2008 | Grier | 250/251 |
| 2008/0212430 A1 | 9/2008 | Bakker et al. | |
| 2009/0218514 A1 | 9/2009 | Klunder et al. | |
| 2009/0218527 A1 | 9/2009 | French et al. | |
| 2009/0225319 A1 | 9/2009 | Lee et al. | |
| 2009/0225411 A1 | 9/2009 | Cui et al. | |
| 2009/0225413 A1 | 9/2009 | Stelzer et al. | |
| 2009/0231689 A1 | 9/2009 | Pittsyn et al. | |
| 2009/0276188 A1 | 11/2009 | Cui et al. | |
| 2010/0059696 A1 * | 3/2010 | Heintzmann et al. | 250/550 |
| 2010/0099984 A1 | 4/2010 | Graser | |
| 2010/0195873 A1 | 8/2010 | Cui et al. | |
| 2010/0309457 A1 | 12/2010 | Cui et al. | |
| 2010/0322494 A1 | 12/2010 | Fauver et al. | |
| 2011/0085219 A1 | 4/2011 | Yang et al. | |
| 2011/0170105 A1 | 7/2011 | Cui et al. | |
| 2011/0181884 A1 | 7/2011 | Cui et al. | |
| 2011/0205339 A1 | 8/2011 | Pavani et al. | |
| 2011/0234757 A1 | 9/2011 | Zheng et al. | |
| 2012/0061554 A1 | 3/2012 | Cui et al. | |
| 2012/0098950 A1 | 4/2012 | Zheng et al. | |
| 2012/0223217 A1 | 9/2012 | Zheng et al. | |
| 2012/0228475 A1 | 9/2012 | Pang et al. | |
| 2012/0267515 A1 | 10/2012 | Wu et al. | |

FOREIGN PATENT DOCUMENTS

| | | |
|---|---|---|
| JP | 2003207454 A | 7/2003 |
| JP | 2003524779 A | 8/2003 |
| KR | 10-2005-006253 | 6/2005 |
| WO | WO-0210713 A2 | 2/2002 |
| WO | WO 2004/038484 | 5/2004 |
| WO | WO 2008107702 A1 * | 9/2008 |
| WO | WO-2008107702 A1 | 9/2008 |
| WO | WO 2009/111573 | 9/2009 |
| WO | WO 2010/040570 | 4/2010 |
| WO | WO 2011/035299 | 3/2011 |
| WO | WO 2011/047053 | 4/2011 |
| WO | WO-2011106324 | 9/2011 |
| WO | WO-2011106327 | 9/2011 |
| WO | WO 2012/122398 | 9/2012 |
| WO | WO 2012/145566 | 10/2012 |

OTHER PUBLICATIONS

Cizmar et al. "Optical conveyor belt based on Bessel beams", Optical Trapping and Optical Micromanipulation, Proceeding of SPIE vol. 5930, pp. 59300X-59300X, Aug. 19, 2005.*
International Search Report and Written Opinion in International Application No. PCT/US2011/025751 mailed on Oct. 25, 2011.
International Search Report in International Application No. PCT/US2011/025762 mailed on Oct. 25, 2011.
Written Opinion in International Application No. PCT/US2011/025762 mailed on Oct. 25, 2011.
International Search Report and Written Opinion in International Application No. PCT/US2010/052512 mailed on Apr. 18, 2011.
European Patent Office (EPO) European Supplementary Search Report in EP Application No. 05749488.2 mailed on Jan. 26, 2012.
European Patent Office (EPO) European Supplementary Search Report in EP Patent Application No. 08730664.3 mailed Feb. 7, 2012.
Japanese Patent Office (JPO) Office Action in JPO patent Application No. 2007-515164 (Jul. 26, 2011).
Japanese Patent Office (JPO) Office Action in JPO patent Application No. 2007-515164 (May 8, 2012).
Japanese Patent Office (JPO) Office Action in JPO patent Application No. 2009-553675 (Jan. 24, 2012).
European Patent Office (EPO) Office Action in EP Patent Application No. 05749488.2 mailed on Jun. 27, 2012.
United States Patent and Trademark Office (USPTO) Office Action in U.S. Appl. No. 12/398,050 mailed on Nov. 14, 2011.
United States Patent and Trademark Office (USPTO) Notice of Allowance in U.S. Appl. No. 12/398,050 mailed on Jul. 17, 2012.
United States Patent and Trademark Office (USPTO) Office Action in U.S. Appl. No. 12/398,098 mailed on May 25, 2011.
United States Patent and Trademark Office (USPTO) Restriction Requirement in U.S. Appl. No. 12/399,823 mailed on Aug. 10, 2011.
United States Patent and Trademark Office (USPTO) Non-Final Office Action in U.S. Appl. No. 12/399,823 mailed on Nov. 14, 2011.
United States Patent and Trademark Office (USPTO) Final Office Action in U.S. Appl. No. 12/399,823 mailed on May 25, 2012.

(56) References Cited

OTHER PUBLICATIONS

"Beam Steering Using Liquid Crystals," Boulder Nonlinear Systems, downloaded from the Internet at http://www.bnonlinear.com/papers/LCBeamSteering.pdf, May 8, 2001.

"Talbot Effect," Wikipedia, last modified Dec. 27, 2011.

"Nipkow Disk" Wikipedia, last modified Aug. 13, 2010.

Bates et al, "Multicolor super-resolution imaging with photo-switchable fluorescent probes," Science 317, 1749-1753 (2007).

Besold, G. and Lindlein, "Fractional Talbot effect for periodic microlens arrays", Optics Engineering, vol. 36, pp. 1099-1105 (Apr. 1997).

Betzig, E., et al.,"Imaging intracellular fluorescent proteins at nanometer resolution," Science, vol. 313, pp. 1642-1645 (2006).

Bishara et al., "Lensfree on-chip microscopy over a wide field-of-view using pixel super-resolution," Opt. Expr. 18, pp. 11181-11191 (2010).

Chalut, K. J., et al., "Quantitative phase microscopy with asynchronous digital holography," Optics EXpress, vol. 15, pp. 3047-3052 (2007).

Conchello, Jose-Angel, and Lichtman, Jeff W., "Optical sectioning microscopy," Nature Methods, vol. 2, No. 12, pp. 920-931 (Dec. 2005).

Cui, Xiquan, et al., "Lensless high-resolution on-chip optofluidic microscopes for Caenorhabditis elegans and cell imaging," Proceedings of the National Academy of Sciences of the Unities States of America, vol. 105, pp. 10670-10675 (2008).

Di Mambro et al., "Sharpness limitations in the projection of thin lines by use of the Talbot experiment," J. Opt. Soc. Am. A 21, pp. 2276-2282 (2004).

Eah et al., "Nearly diffraction-limited focusing of a fiber aXicon microlens," Rev. Sci. Instrum. 74(11), 4969-4971 (2003).

Frey, H.G., et al.,"High-resolution imaging of single fluorescent molecules with the optical near-field of a metal tip," Phys. Rev. Let. 93, 200801 (2004).

Giloh et al., "Fluorescence microscopy: reduced photobleaching of rhodamine and fluorescein protein conjugates by n-Propyl Gallate," Science 217, pp. 1252-1255 (1982).

Grosjean et al., "Fiber MicroaXicons Fabricated by a Polishing Technique for the Generation of Bessel-Like Beams," Applied Optics 46(33) 8061-8063 (2007).

Heng, Xin, et al., "An Optical Tweezer Actuated, Nanoaperture-grid based Optofluidic Microscope Implimentation Method," Optics EXpress, vol. 15, No. 25, 16367-75 (2007).

Heng, Xin, et al., "Optofluidic Microscopy—a method for implementing a high resolution optical microscope on a chip," Lab Chip, vol. 6, pp. 1274-1276 (2006).

Ho, J., et al., "Use of whole slide imaging in surgical pathology quality assurance: design and pilot validation studies," Human Pathology 37, pp. 322-331 (2006).

Kimura, Yasuo, et al., "Compact optical head using a holographic optical element for CD players," Appl. Opt. 27, pp. 668-671 (1988).

Lee, Lap Man, et al., "The Application of On-Chip Optofluidic Microscopy for Imaging Giardia lamblia Trophozoites and Cysts," Biomed Microdevices, Springer DOI 10.1007/s10544-009-9312-X (2009).

Leger, J.R., et al, "Efficient array illuminator using binary-optics phase plates at fractional-Talbot planes," Optics Letters 15, pp. 288-290 (1990).

Lohmann, A.W. and Silva D.E., "An Interferometer based on the Talbot Effect," Optics Communications, vol. 2, No. 9, pp. 413-415 (Feb. 1971).

Marquet, Pierre, et al., "Digital holographic microscopy: a noninvasive contrast imaging technique allowing quantitative visualization of living cells with subwavelength aXial accuracy," Optics Letters, vol. 30, No. 5, pp. 468-470 (Mar. 2005).

Miao, Qin, et al., "Dual-modal three-dimensional imaging of single cells with isometric high resolution using an optical projection tomography microscope," Journal of Biomedical Optics, vol. 14 (2009).

Merenda, F., et al., "Miniaturized high-NA focusing-mirror multiple optical tweezers," Opt. EXp. 15, 6075-6086 (2007).

Montgomery, W.D., "Self-Imaging Objects of Infinite Aperture," J. Opt. Soc. Am., vol. 57, pp. 772-775 (1967).

Oheim, "High-throughput microscopy must re-invent the microscope rather than speed up its functions," Brit, J. Pharm. 152, op. 1-4 (2007).

Pang, Sean, et al., "Implementation of a color-capable optofluidic microscope on a RGB CMOS color sensor chip substrate," Lab on a Chip, vol. 10, pp. 411-414 (2010).

Patorski, "The self-imaging phenomenon and its applications," Progress in Opt. 27, pp. 3-108 (1989).

Pfeiffer, F., et al., "Hard-X-ray dark-field imaging using a grating interferometer," Nature Materials 7, pp. 134-137 (2008).

Pfeiffer, Franz, et al., "Phase retrieval and differential phase-contrast imaging with low-brilliance X-ray sources," Nat. Phys, vol. 2, pp. 258-261 (published online on Mar. 26, 2006).

Planchon, et al., "Rapid three-dimensional isotropic imaging of living cells using Bessel beam plane illumination," Nat. Methods 8(5) (2011).

Rojo, et al., "Critical comparison of 31 commercially available digital slide systems in pathology," Int'l J. Surg. Path. 14, pp. 285-305 (2006).

Sanchez, E.J., et al., "Near-field fluorescence microscopy based on two-photon eXcitation with metal tips," Phys. Rev. Let. 82, 4014 (1999).

Talbot, "LXXVI. Facts relating to optical science. No. IV," Philosophical Magazine Series 39, pp. 401-407 (1836).

Tao et al., "The generation of an array of nondiffracting beams by a single composite computer generated hologram," J. Opt. A: Pure Appl. Opt. 7, 40-46 (2005).

Titus, Charles M., et al., "Efficient, Accurate Liquid Crystal Digital Light Deflector," Proc. SPIE, vol. 3633(1), pp. 244-253 (Jun. 1999).

Tsien, Roger, et al., "Fluorophores for Confocal Microscopy: Photophysics and Photochemistry," Handbook of Biological Confocal Microscopy, third edition, Springer Science + Business Media, pp. 38-352 (2006).

Turunen, et al., "Holographic generation of diffraction-free beams," Appl. Opt. 27(19), 3959-3962 (1988).

Wu, et al., "Focal Plane tuning in Wide Field-of-view Microscope with Talbot Pattern Illumination," Opt. Lett. 36, 2179-2181 (2011).

Wu, J., et al., "Focus grid generation by in-line holography," Optics Express, vol. 18, p. 14366-14374 (2010).

Wu, J., Cui, X., Lee, L. M. and Yang, C., "The application of Fresnel zone plate based projection in optofluidic microscopy," Opt. Exp. 16, 15595 (2008).

Wu, J., et al., "Wide field-of-view microscope based on holographic focus grid illumination," Optics Letters, vol. 35, No. 13 (2010).

Zapata-Rodriguez, Carlos, et al., "Three-dimensional Field Distribution in the Focal Region of Low-Fresnel-Number AXicons," F. Opt. Soc. Am. A 23(12) 3016-3017 (2005).

Zheng, G.A., et al., "Sub-pixel resolving optofluidic microscope for on-chip cell imaging," Lab on a Chip, vol. 10, pp. 3125-3129 (2010).

Zheng, G., et al., "Supplementary Information for: Sub-pixel resolving optofluidic microscope for on-chip cell imaging," Lap Chip, vol. 10 (2010).

Zhu et al., "Generation of controllable nondiffracting beams using multimode optical fibers," Appl. Phys. Lett. 94, 201102 (2009).

Wu, Jigang, et al., "Focal plane tuning in wide-field-of-view microscope with Talbot pattern illumination," Optics Letters 36 (12), pp. 2179-2181 (2011).

Zheng, Guoan, "The ePetri dish, an on-chip cell imaging platform based on subpixel perspective sweeping microscopy (SPSM)," Proceedings of the National Academy of Science 108 (41), pp. 16889-94 (2011).

Pang, Shuo, et al., "Fluorescence microscopy imaging with a Fresnel zone plate array based optofluidic microscope," Lab on a Chip 11, 3698-3702, (2011).

United States Patent and Trademark Office (USPTO) Office Action in U.S. Appl. No. 11/125,718 dated on Nov. 14, 2008.

United States Patent and Trademark Office (USPTO) Final Office Action in U.S. Appl. No. 11/125,718 dated on Jul. 1, 2009.

(56) References Cited

OTHER PUBLICATIONS

United States Patent and Trademark Office (USPTO) Office Action in U.S. Appl. No. 12/797,132 dated on Oct. 15, 2010.
United States Patent and Trademark Office (USPTO) Office Action in U.S. Appl. No. 11/686,095 dated on Jan. 10, 2008.
United States Patent and Trademark Office (USPTO) Office Action in U.S. Appl. No. 11/686,095 dated on Jul. 17, 2008.
United States Patent and Trademark Office (USPTO) Office Action in U.S. Appl. No. 11/686,095 dated on Feb. 26, 2009.
United States Patent and Trademark Office (USPTO) Final Office Action in U.S. Appl. No. 11/686,095 dated on Oct. 28, 2009.
United States Patent and Trademark Office (USPTO) Notice of Allowance in U.S. Appl. No. 11/686,095 dated on Feb. 25, 2010.
United States Patent and Trademark Office (USPTO) Office Action in U.S. Appl. No. 12/785,635 dated on Oct. 15, 2010.
United States Patent and Trademark Office (USPTO) Notice of Allowance in U.S. Appl. No. 11/125,718 dated on Mar. 11, 2010.
United States Patent and Trademark Office (USPTO) Non-Final Office Action in U.S. Appl. No. 12/903,650 dated on Jan. 14, 2013.
United States Patent and Trademark Office (USPTO) Final Office Action in U.S. Appl. No. 12/903,650 dated on Nov. 7, 2013.
United States Patent and Trademark Office (USPTO) Notice of Allowance in U.S. Appl. No. 12/903,650 dated on Feb. 26, 2014.
United States Patent and Trademark Office (USPTO) Notice of Allowance in U.S. Appl. No. 12/903,650 dated on Apr. 25, 2014.
United States Patent and Trademark Office (USPTO) Non-Final Office Action in U.S. Appl. No. 13/032,449 dated on Mar. 7, 2014.
United States Patent and Trademark Office (USPTO) Notice of Allowance in U.S. Appl. No. 13/032,449 dated on Nov. 3, 2014.
United States Patent and Trademark Office (USPTO) Notice of Allowance in U.S. Appl. No. 13/415,657 dated on Nov. 4, 2014.
United States Patent and Trademark Office (USPTO) Non-Final Office Action in U.S. Appl. No. 13/451,543 dated on Jun. 11, 2014.
United States Patent and Trademark Office (USPTO) Notice of Allowance in U.S. Appl. No. 13/451,543 dated on Sep. 30, 2014.
United States Patent and Trademark Office (USPTO) Non-Final Office Action in U.S. Appl. No. 12/399,823 dated on May 15, 2014.
United States Patent and Trademark Office (USPTO) Final Office Action in U.S. Appl. No. 12/399,823 dated on Nov. 10, 2014.
United States Patent and Trademark Office (USPTO) Notice of Allowance in U.S. Appl. No. 12/399,823 dated on Jan. 29, 2015.
PCT International Preliminary Report on Patentability and Written Opinion dated Apr. 26, 2012 issued in PCT/US2010/052512.
PCT International Preliminary Report on Patentability and Written Opinion dated Sep. 7, 2012 issued in PCT/US2011/025751.
PCT International Preliminary Report on Patentability dated Sep. 7, 2012 issued in PCT/US2011/025762.
PCT International Search Report and Written Opinion dated Sep. 3, 2012 issued in PCT/US2012/028328.
PCT International Preliminary Report on Patentability and Written Opinion dated Sep. 19, 2013 issued in PCT/US2012/028328.
PCT International Search Report and Written Opinion dated Nov. 28, 2012 issued in PCT/US2012/034339.
PCT International Preliminary Report on Patentability and Written Opinion dated Oct. 31, 2013 issued in PCT/US2012/034339.
Confocal Microscopy, Wikipedia, last modified Aug. 25, 2010, 3 pages.
Confocal Raman Microscopy (Oct. 2006) "Optofluidic Microscope Enables Lensless Imaging of Microorganisms," *Biophotonics International*, 13(10):24.
Types of confocal microscopy, downloaded from the Internet at http://www.mikriskipie.org/2008/01/26/types-of-confocal-microscopy/14/ on Sep. 10, 2010.
Brockie et al., (Mar. 1, 2001) "Differential Expression of Glutamate Receptor Subunits in the Nervous System of *Caenorhabditis elegans* and Their Regulation by the Homeodomain Protein UNC-42," *The Journal of Neuroscience*, 21(5):1510-1522.
Coskun, A.F., et al., (Sep. 7, 2011) "Wide-field lensless fluorescent microscopy using a tapered fiber-optic faceplate on a chip," *Analyst*, 136(17):3512-3518.
Dubey et al., (2007) "Wavelength-scanning Talbot effect and its application for arbitrary three-dimensional step-height measurement," *Optics Communications*, 279:13-19.
Garcia-Sucerquia, J. et al., (2006) "Immersion digital in-line holographic microscopy," *Optics Letters*, 31:1211-1213.
Goodman et al., (2005) "Holography," Chapter 9: pp. 297-393, *Introduction to Fourier Optics*, 3rd Edition, Roberts & Company Publishers.
Han, (2013) "Wide-Field-of-View On-Chip Talbot Fluorescence Microscopy for Longitudinal Cell Culture Monitoring from within the Incubator," *Analytical Chemistry* 85(4):2356-2360.
Kagalwala, Farhana and Kanade, Takeo (Oct. 2003) "Reconstructing Specimens Using DIC Microscope Images," IEEE *Transactions on Systems, Man, and Cybernetics-Part B: Cybernetics*, 33(5)728-737.
Lange et al., (2005) "A microfluidic shadow imaging system for the study of the nematode *Caenorhabditis elegans* in space," *Sensors and Actuators B*, 107:904-914.
Merenda, F., et al., (2007) "Miniaturized high-NA focusing-mirror multiple optical tweezers," *Opt. Exp.* 15:6075-6086.
Mudanyali, O., et al., (Jun. 7, 2010) "Compact, light-weight and cost-effective Microscope based on Lensless Incoherent Holography for Telemedicine Applications," *Lab on a Chip*, 10:1417-1428, 25 pp.
Ottevaere et al., (2006) "Comparing glass and plastic refractive microlenses fabricated with different technologies," *Journal of Optics a-Pure and Applied Optics*, 8(7):5407-5429.
Pang et al., (Dec. 1, 2012) "Wide and Scalable Field-of View Talbot-Grid-Based Fluorescence Microscopy," *Optic Letters* 37(23):5018-5020.
Pang et al., (Jun. 17, 2013) "Wide Field of View Talbot grid-based microscopy for multicolor fluorescence imaging," *Optic Express*, 21(12):14555-14565.
Perkins et al., (1986) "Mutant Sensory Cilia in the Nematode *Caenorhabditis elegans*," *Developmental Biology*, 117:456-487.
Repetto L., et al., (2004) "Lensless digital holographic microscope with light-emitting diode illumination," *Opt. Lett.*, 29:1132-1134.
Richard et al., (2009) "An integrated hybrid interference and absorption filter for fluorescence detection in lab-on-a-chip devices," *Lab on a Chip*, 9:1371:1376.
Seo, et al., (2009) "Lensfree holographic imaging for on-chip cytometry and diagnostics," *Lab on a Chip*, 9(6):777-787.
Slavich "Technical specifications of holography materials," downloaded from the Internet at http://www.slavich.com/holo_summary [retrieved on Jun. 12, 2013], 2pp.
Spring, Kenneth R., et al., "Introduction to Fluorescence Microscopy," <http://www.microscopyu.com/articles/fluorescence/fluorescenceintro.html> (Aug. 25, 2004).
Tam et al., (May 24, 2004) "An imaging fiber-based optical tweezer array for microparticle array assembly," *Appl. Phys. Lett.*, 84(21):4289-4291.
Tsien, Roger, et al., (1998) "The green fluorescent protein," *Annual Review of Biochemistry*, 67:509-544.
Turunen, et al., (1988) "Holographic generation of diffraction-free beams," *Appl. Opt.* 27(19):3959-3962.
Wang et al., (2009) "Characterization of acceptance angles of small circular apertures," *Optics Express* 17(26):23903-23913.
Wang et al. (Jun. 26, 2012) "Deep-tissue focal fluorescence imaging with digitally time-reversed ultrasound-encoded light," *Nature Communications* 3(928):8 pages.
Xu, et al. (2001) "Digital in-line holography for biological applications," *PNAS USA*, 98:11301-11305.
United States Patent and Trademark Office (USPTO) Notice of Allowance in U.S. Appl. No. 13/415,657 dated on Mar. 11, 2015.

* cited by examiner

HIGH RESOLUTION IMAGING DEVICES WITH WIDE FIELD AND EXTENDED FOCUS

CROSS-REFERENCES TO RELATED APPLICATIONS

This is a non-provisional application of, and claims priority to, U.S. Provisional Patent Application No. 61/307,324 entitled "Three Dimensional Imaging with Optofluidic Microscopes" filed on Feb. 23, 2010 and U.S. Provisional Patent Application No. 61/307,328 entitled "High-Resolution Microscopy with a Wide Field and Extended Focus" filed on Feb. 23, 2010. These provisional applications are hereby incorporated by reference in their entirety for all purposes.

This non-provisional application is related to the following co-pending and commonly-assigned patent applications, which are hereby incorporated by reference in their entirety for all purposes:

U.S. patent application Ser. No. 13/032,449 entitled "Non-diffracting Beam Detection Devices for Three-Dimensional Imaging" filed on Feb. 22, 2011.

BACKGROUND OF THE INVENTION

Embodiments of the present invention generally relate to imaging devices. More specifically, certain embodiments relate to high resolution imaging device with wide field and extended focus used in applications such as microscopy or photography.

With ever increasing forms and modalities, microscopes are proving to be powerful tools for exploring modern science. The gentleness of light has especially made an optical microscope a tool of choice to noninvasively probe living cells.

Despite being mature tools, conventional optical microscopes do not have the ability to acquire high resolution images of large sample volumes. This inability is the consequence of a tradeoff between a conventional microscope's resolution, its field of view, and its depth of field. While the resolution of a conventional microscope defines the size of the smallest sample detail that can be discerned, the field of view defines the largest transverse (x, y) sample area that can be imaged, and the depth of field defines the maximum axial (z) sample thickness that can be imaged in focus. Resolution, field of view, and depth of field are tightly constrained parameters in these conventional optical microscopes. In conventional microscopes, any attempt to increase resolution fundamentally results in a decrease in the depth of field, and for practical purposes decreases the field of view. Conventional microscopes are therefore restricted to acquire either low resolution images of large sample volumes, or high resolution images of small sample volumes.

BRIEF SUMMARY OF THE INVENTION

Embodiments of the present invention relate to a high resolution imaging device with wide field and extended focus (HRID) that can generate high resolution two-dimensional images of thick sample volumes. The HRID uses a plurality of nondiffracting beams (e.g., Bessel beams) that can propagate through the extended depth of a thick sample volume having an object being imaged. The HRID illuminates the sample volume by scanning the nondiffracting beams through the sample volume or moving the sample through the nondiffracting beams. The HRID images the object in the sample on a light detector (e.g., photosensor) directly (direct imaging) or with an inexpensive lens projecting images onto the light detector (projection imaging). In this way, the HRID can acquire two-dimensional images over large areas of the sample, while promptly showing intricate high resolution details, even those that are well outside the focal plane of traditional microscopes. The HRID has an extended focal range due to the relatively long length of the nondiffracting beams compared to the depth of field in traditional microscopes.

One embodiment is directed to an HRID comprising a beam generator for generating a plurality of nondiffracting beams and a scanning mechanism for moving the plurality of nondiffracting beams relative to the object to illuminate a volume of the object. The HRID also comprises surface element and a body having a light detector layer outside the surface element. The light detector layer has a light detector configured to measure light data associated with the plurality of nondiffracting beams illuminating the volume of the object. In some cases, the HRID also includes a lens inside of the light detector layer.

Another embodiment is directed to an HRID comprising a beam generator configured to generate a plurality of nondiffracting beams and a body having a fluid channel, a surface layer, and a light detector layer. The fluid channel has a first channel surface and a second channel surface. The fluid channel also has a flow moving an object through the nondiffracting beams propagating through the fluid channel. The surface layer is located outside the first channel surface. The light detector layer is located outside the surface element. The light detector layer has a light detector configured to measure time varying light data associated with the plurality of nondiffracting beams as the object moves through the fluid channel.

These and other embodiments of the invention are described in further detail below.

DETAILED DESCRIPTION OF THE INVENTION

Figure 1:
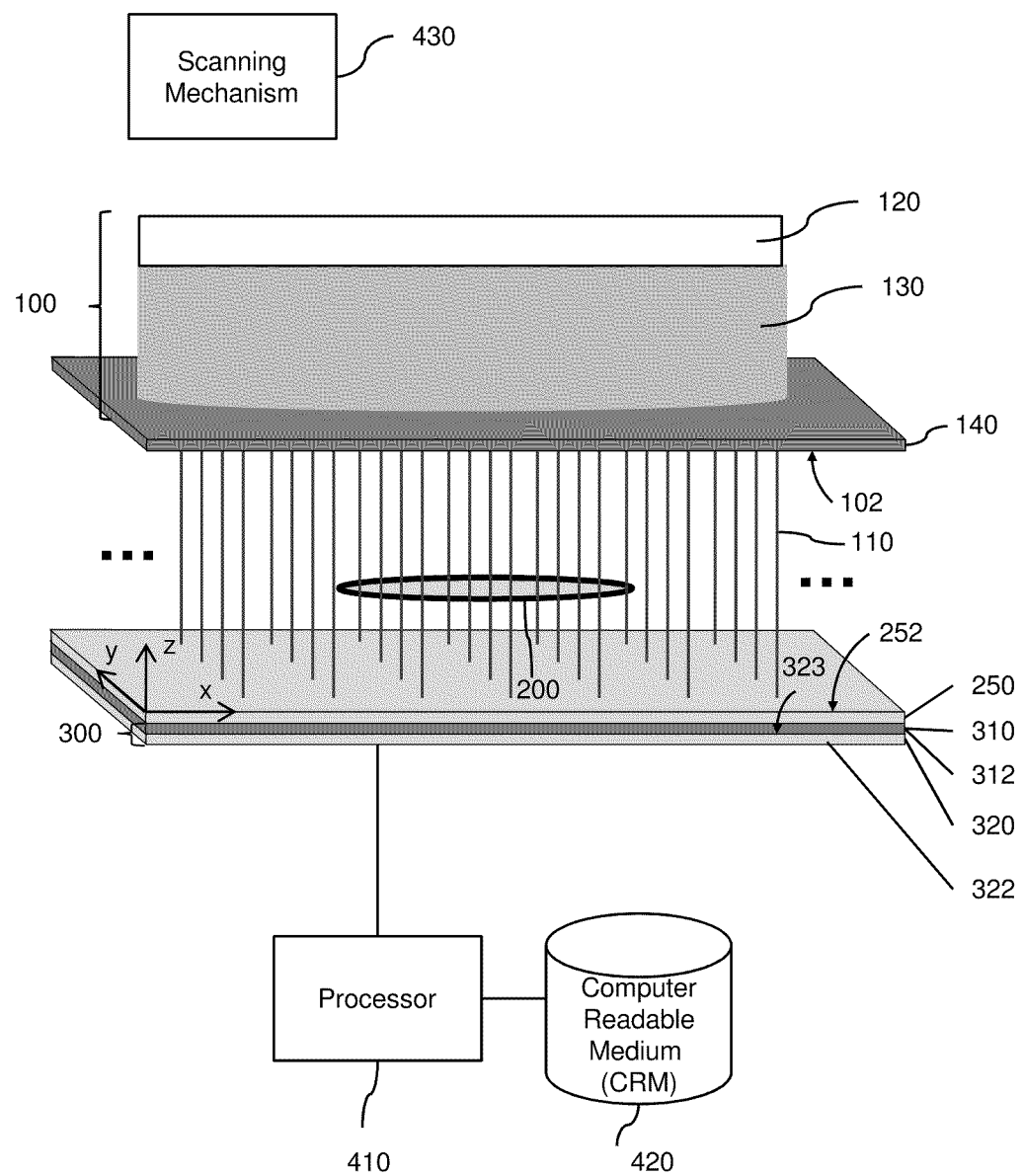
FIG. 1 is a schematic drawing of components of a HRID in a direct imaging scheme, according to embodiments of the invention.

Embodiments of the present invention will be described below with reference to the accompanying drawings. The HRID has a beam generator that can create a plurality of nondiffracting beams (e.g., series of Bessel beams) that propagate through the thickness of a sample (extended depth of field) having an object being imaged. A scanning mechanism is used to illuminate a sample volume with the object. The scanning mechanism either scans the nondiffracting beams (e.g., Bessel beams) through the sample volume or moves the sample volume through the nondiffracting beams. By using the scanning mechanism, the HRID can illuminate a thick sample over a large area (wide field of view). The HRID then images the object directly onto a light detector (direct imaging) or projects with a lens onto the light detector (projection imaging). In this way, the HRID can acquire two-dimensional images of large areas, while promptly showing intricate high resolution details, even those that are well outside the focal plane of traditional microscopes. The HRID has an extended focal range due to the relatively long length of the nondiffracting beams compared to the depth of field in traditional microscopes.

The HRID decouples the tradeoff that conventional imaging devices have between high resolution, and a wide field of view and depth of field. The HRID illuminates an object being imaged with nondiffracting beams (e.g., Bessel beams) that propagate through the depth of the object with a constant spot size in the submicron range. Since image resolution in an HRID is based primarily on spot size of the illuminating beams, an HRID is capable of providing images at submicron resolution since the spot size can be less than a micron. Since nondiffracting beams illuminate a line through a relatively long distance, the HRID can provide an extended depth of field through large sample volumes. The HRID provides a wide field of view using a plurality of illuminating nondiffracting beams and scanning to illuminate across a relatively large area. In this way, the HRID can acquire high resolution two-dimensional images of objects with a wide field of view and extended depth of field.

Embodiments of the invention provide one or more technical advantages. As mentioned above, one advantage of the HRID is that it can acquire high resolution images of objects with a wide field of view and an extended depth of field. Another advantage is that the HRID can be assembled with few components in a simple multi-layered arrangement (on-chip application). Since the body is multilayered, the HRID can be fabricated inexpensively using standard semiconductor and micro/nanofabrication procedures. Also, a multilayered structure can be easily miniaturized. Another advantage is that the HRID can provide high throughput rates. For example, the HRID can use optofluidic flow as a scanning mechanism to quickly image objects flowing through the device. In addition, multiple HRIDs (e.g., 100, 200, etc.) can be combined in parallel since they are relatively compact, simple devices. Multiple HRIDs can provide high throughput imaging of large sample volumes. Another advantage is that the HRID has the ability to acquire high resolution images of large sample volumes. Unlike traditional microscopes, the HRID can illuminate an object with a series of nondiffracting beams that propagate through the sample with a constant spot size. The object is then imaged on a light detector (sensor) directly or with an inexpensive lens with a small numerical aperture. By scanning the sample through the series of beams, the HRID system has the ability to acquire high resolution images of large sample volumes. With this high resolution imaging, the HRID may prove particularly useful to biologists and others, for example, to investigate large sample volumes, while simultaneously being able to discern intricate high resolution details.

I. HRID

The HRID can be implemented in a direct imaging scheme and in a projection imaging scheme. In the directly imaging scheme, an object is illuminated by the nondiffracting beams (e.g., Bessel beams) and the transmission of the nondiffracting beams are detected directly by an imaging light detector (sensor). In the projection imaging scheme, the object is imaged by a simple lens projecting onto an imaging light detector (sensor). In either scheme, to acquire an image of the object, the HRID uses a scanning device (e.g., raster scanner) to scan the object, or uses a similar scanning mechanism as used in optofluidic microscopy, where an image can be acquired by simply doing linear scanning. An example of a scanning mechanism used in optofluidic microscopy can be found in X. Heng, D. Erickson, L. R. Baugh, Z. Yaqoob, P. W. Sternberg, D. Psaltis, and C. H. Yang, "Optofluidic microscopy—a method for implementing a high resolution optical microscope on a chip," Lab on a Chip 6, 1274-1276 (2006), which is hereby incorporated by reference in its entirety for all purposes.

A. Direct Imaging

FIG. 1 is a schematic drawing of components of a HRID 10 in a direct imaging scheme, according to embodiments of the invention. The HRID 10 includes a beam generator 100 having an illumination source 120 providing an excitation beam 130 (e.g., plane wave excitation beam) and a holographic element 140 (e.g., CGH) generating the plurality of nondiffracting beams 110 when illuminated by the excitation beam 130. The beam generator 100 also includes a beam generator surface 102. The HRID 10 also includes a surface element 250 having a first surface 252. The HRID 10 also includes a body 300 comprising a filter layer 310 having a filter 312 and a light detector layer 320 having a light detector 322. In some embodiments, the HRID 10 may include more or fewer layers, and may include only a light detector layer 320 having a light detector 322. An object 200 being imaged is located between the surface element 250 and the beam generator 100 of the HRID 10. In other embodiments, the object 200 may have another suitable location between the surface element 250 and the beam generator 100 of the HRID 10. For example, the object 200 may be located proximal the first surface 252 of the surface element 250 in some embodiments. The HRID 10 also includes a processor 410 communicatively coupled to the light detector 322, and a computer readable medium 420 communicatively coupled to the processor 410, and a scanning mechanism 430 capable of moving the nondiffracting beams 110 relative to the object 200 or the object 200 relative to the nondiffracting beams 110.

The HRID 10 also includes an x-axis, a y-axis, and a z-axis. The x-axis and y-axis lie in the plane of the first surface 252 of the surface element 250. The z-axis is orthogonal to this plane.

In a general operation, the HRID 10 shown in FIG. 1 illuminates the object 200 with the plurality of nondiffracting beams 110 that propagate through the object 200 with a constant spot size or substantially constant spot size. The object 200 is then imaged on the light detector 322 directly (direct imaging). By using the scanning mechanism 430 to scan the object 200 through the plurality of nondiffracting beams 110 or the nondiffracting beams 110 through the object 200, the HRID 10 has the ability to acquire high resolution images of large sample volumes.

As used herein, a nondiffracting beam 110 refers to a field of electromagnetic radiation that has little to no diffraction with propagation. For example, as a nondiffracting beam 110 propagates, the nondiffracting beam does not substantially diffract and maintains a tight focus confining photons within a narrow width and sustaining constant width over a relatively long section of the beam's axis. An example of a nondiffracting beam is a Bessel beam.

In FIG. 1, each nondiffracting beam 110 can have any suitable light property (e.g., intensity, phase, polarization etc.) and any suitable size (spot size, length, etc.). For example, the nondiffracting beam 110 can have a substantially constant spot size of less than a micron in diameter (submicron size). As another example, the nondiffracting beam 110 may have a length of 250 microns or greater.

FIGS. 2(a) and 2(b) illustrate a side by side comparison of a Bessel beam (i.e. a type of nondiffracting beam) and a focusing spherical wave with 0.3 numerical aperture. FIG. 2(a) is an intensity graph of a slice in an XZ plane of the Bessel beam from simulation results, according to embodiments of the invention. FIG. 2(b) is an intensity graph of a slice in the XZ plane of the focusing spherical wave with a 0.3 numerical aperture from simulation results, according to embodiments of the invention. The Bessel beam in FIG. 2(a) has a beam length of at least 250 microns and has resolution (half spotsize) of less than 1 μm The beam of the focusing spherical wave in FIG. 2(b) has a beam length of approximately 10 microns and has a resolution of about 1 μm As shown, the illustrated Bessel beam has a narrow width for an extended length (z-distance) whereas the focusing spherical wave has a relatively short beam length in comparison. By comparing beam lengths, FIGS. 2(a) and 2(b) illustrate that a Bessel beam or other nondiffracting beam can confine photons within a narrow width through an extended depth of field in comparison to the shorter depth of field of the focusing spherical wave.

Figure 3:
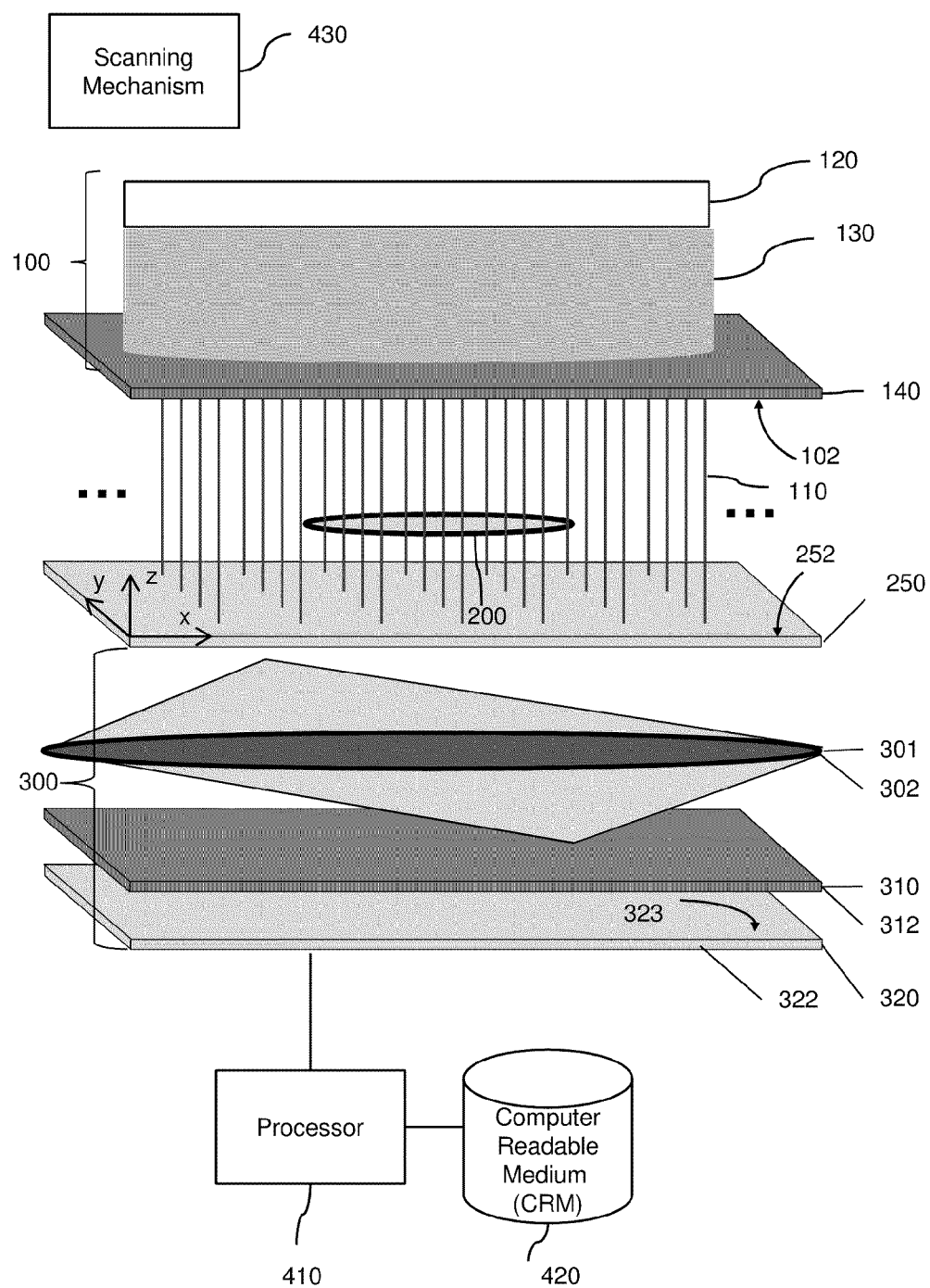
FIG. 3 is a schematic drawing of components of a HRID in a projection imaging scheme, according to embodiments of the invention.
Figure 4:
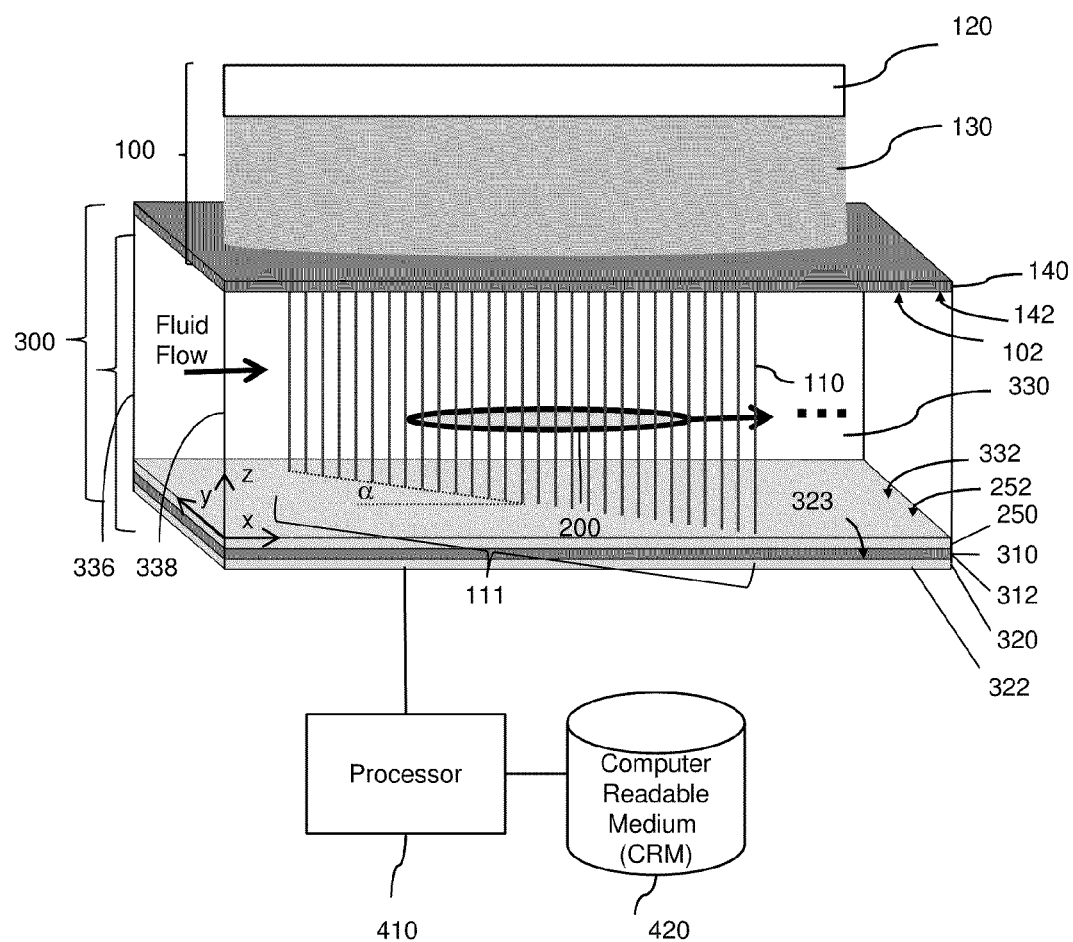
FIG. 4 is a schematic drawing of components of a HRID using optofluidic flow as a scanning mechanism and employs the direct imaging scheme to generate two-dimensional high resolution images of an object, according to embodiments of the invention.

In many embodiments, the plurality of nondiffracting beams 110 can include any suitable number of nondiffracting beams 110 (e.g., 1, 50, 100, 200, 1000, etc.) in any suitable arrangement. Some examples of suitable arrangements include a one-dimensional array, a two-dimensional array, a three-dimensional array, and a multiplicity of one-dimensional, two-dimensional, and/or three-dimensional arrays of any suitable dimensions. An example of a one-dimensional (29×1) array is shown in FIG. 4. Examples of two-dimensional (7×4) arrays are shown in FIGS. 1 and 3. Although the illustrated examples show certain dimensions, arrays having other suitable dimensions (e.g., 200×1, 200×100, 1000×200, 20×10, etc.) can be used in other embodiments.

In addition, the arrays of embodiments can have any suitable orientation or combination of orientations. In some embodiments, the arrays may be oriented along the x axis. Examples of two-dimensional arrays oriented along the x-axis are shown FIGS. 1 and 3. In other embodiments, the arrays may be oriented at an angle with respect to the x-axis. An example of a plurality of nondiffracting beams 110 arranged in a one-dimensional array that extends diagonally at an angle with respect to the x axis is shown in FIG. 4. In this illustrated example, the one-dimensional array extends diagonally from one lateral side to an opposing lateral side of the fluid channel 330 having a fluid flow. In this example, the array is oriented at an angle, α, with respect to a longitudinal axis of the fluid channel 330.

Each of the nondiffracting beams 110 has an illumination path which lies substantially along a line. In FIG. 1, the plurality of nondiffracting beams 110 lie in the z-direction and have illumination paths that lie substantially along z-directional lines at a set of discrete transverse (X, Y) locations across a portion of the surface element 250. In other embodiments, the nondiffracting beams 110 may lie at an angle to the z-axis.

As used herein, a beam generator 100 refers to any suitable device or combination of devices that can generate the plurality of nondiffracting beams 110. An example of a suitable combination of devices is shown in FIG. 1 and includes a holographic element 140 (e.g., CGH) in communication with an illumination source (e.g., laser) 130 providing an excitation beam 130 (e.g., plane wave excitation beam). In this example, the holographic element 140 generates the plurality of nondiffracting beams 110 upon being illuminated by the excitation beam 130. Another example of a suitable combination of devices includes one or more microaxicons. Another example of suitable combination of devices includes a device having optical fibers. These examples and others are described in Section III below. Although FIG. 1 includes a holographic element 140 and illumination source 120 providing an excitation beam 130, other embodiments may include another suitable device or combination of devices that can generate the plurality of nondiffracting beams 110.

The illumination source 120 may be any suitable device(s) capable of providing an excitation beam 130. Some examples of suitable devices include light-emitting diodes (LEDs), laser of suitable wavelength, broadband source (e.g., mercury lamp, halogen lamp, etc.) with a suitable filter, natural light, etc. Suitable illumination sources are commercially available. The illumination source 120 may be placed in any location and at any orientation that allows it to generate an appropriate excitation beam 130 at the holographic element 140. The illumination source 120 may provide an appropriate excitation beam 130 of a suitable wavelength, intensity, phase, polarization, spin angular momentum or other light property, and spatial distribution. The illumination source 120 may provide a coherent, incoherent, or partially coherent excitation beam 130. In exemplary fluorescence/phosphorescence embodiments, the illumination source 120 provides excitation light having a first light property (e.g., first wavelength) matching the excitation wavelength of the fluorophores in an object 200 being imaged by the HRID 10. The fluorophores are excited by the excitation light and emit light (emissions) of a second light property (e.g., second wavelength). Some examples of suitable excitation light include fluorescence, 2-photon or higher order fluorescence, Raman, second harmonic or higher order, or other emission mechanism that results in emissions at a different wavelength or other different light property than the excitation light. Although the illumination source 120 in FIG. 1 is a component of the HRID 10, the illumination source 120 may be separate from the HRID 10 in other embodiments.

As used herein, a holographic element 140 refers to any CGH or optically recorded hologram capable of converting an excitation beam 130 from an illumination source 120 into the plurality of nondiffracting beams 110. In FIG. 1, the holographic element 140 is a CGH. In many illustrated embodiments, the holographic element 140 transforms a planar wave of the excitation beam 130 from the illumination source 120 into the plurality of nondiffracting beams 110. The holographic element 140 can be made of any suitable material or materials. Some examples of suitable holographic materials include photographic emulsions, dichromated gelatin, and photoresists. The holographic element 140 can have any suitable dimensions (e.g., 1 mm×1 mm, 2 mm×2 mm, 5 mm×2 mm, 10 mm×10 mm, 10 mm×50 mm, etc.). In the case of a optically recorded hologram, the holographic element 140 can be made using any holographic recording technique capable of encoding (recording) data about the plurality of nondiffracting beams 110. Some examples of suitable holographic recording techniques include in-line (Gabor) and off-axis (Leith-Upatnieks). To play back the recording, the holographic element 140 can be illuminated by an excitation beam 130 having the same wavelength, same spatial distribution, but not necessarily the same intensity, as the reference beam used to record the holographic element 140. In many embodiments, the holographic element 140 is a CGH that is designed to generate a plurality of well-separated nondiffracting beams 110 upon being illuminated by a plane wave excitation beam 130. Some examples of suitable CGHs are described in Section III below.

The scanning mechanism 430 can include any suitable device (e.g., raster scanner) or structural element (e.g., fluid channel) capable of moving the object 200 or surface element 250 holding the object 200 relative to the plurality of nondiffracting beams 110 or moving the plurality of nondiffracting beams 110 relative to the object 200. Although the scanning mechanism 430 is a component of the HRID 10 in illustrated embodiments, the scanning mechanism 430 may be separate from the HRID 10 in other embodiments. Although not shown, the scanning mechanism 430 can be associated with the beam generator 100, the object 200, or the surface element 250 (e.g., a slide holding an object 200).

In some embodiments, the scanning mechanism 430 can be associated with one or more components of the beam generator 100. For example, the scanning mechanism 430 can be associated with the holographic element 140 of the beam generator 100 to be able to move the plurality of nondiffracting beam 110 through a volume of the object 200.

In some embodiments, the scanning mechanism 430 can be associated with the object 200 such that it is able to move the object 200 being imaged relative to the plurality of nondiffracting beams 110. For example, the scanning mechanism 320 can be an optical tweezer that can move the object 200 relative to the plurality of nondiffracting beams 110. As another example, the scanning mechanism 430 can be similar to the scanning mechanism as used in optofluidic microscopy, where an image is acquired as an object 200 moves in a fluid flow through a fluid channel 330 as shown in FIG. 4. An example of a scanning mechanism used in optofluidic microscopy can be found in X. Heng, D. Erickson, L. R. Baugh, Z. Yaqoob, P. W. Sternberg, D. Psaltis, and C. H. Yang, "Optofluidic microscopy—a method for implementing a high resolution optical microscope on a chip," Lab on a Chip 6, 1274-1276 (2006), which is hereby incorporated by reference in its entirety for all purposes.

In some embodiments, the scanning mechanism 430 can be associated with the surface element 250 (e.g., slide or other translational platform). For example, the scanning mechanism 430 can be coupled to the surface element 250 and the surface element 250 can hold the object 200 such that it is able to move the object 200 being imaged relative to the plurality of nondiffracting beams 110.

Any suitable object 200, objects 200, or portion of an object 200 may be imaged by the HRID 10. Typically, the HRID 10 images an object 200 within a specimen (sample) introduced to the HRID 10. For example, a specimen with objects 200 may be located on the surface element 250 (e.g., a slide) and the surface element 250 is placed on the body 300 of the HRID 10 for imaging of the objects 200. Suitable objects 200 can be biological or inorganic entities. Examples of biological entities include whole cells, cell components, microorganisms such as bacteria or viruses, cell components such as proteins, etc. Inorganic entities may also be imaged by embodiments of the invention. Examples of inorganic entities include mineral fibers, and crystals. The object 200 can have any thickness.

In many embodiments, the plurality of nondiffracting beams 110 can illuminate through the entire depth of the sample having one or more objects 200. By implementing the scanning mechanism 430, a sample (specimen) volume can be illuminated by the plurality of nondiffracting beams 110. The sample volume may include a portion of an object volume, or one or more object volumes. In many embodiments, the entire sample volume including the volume of one or more objects 200 may be illuminated by the plurality of nondiffracting beams 110.

The HRID 10 includes a body 300. In some embodiments, the body 300 may be a single, monolithic structure. In other embodiments, the body 300 may be a multi-layer structure. The layers of a multi-layer body 300 may be of any suitable material or combination of materials having any suitable thickness or thicknesses. The layers of a multi-layer body 300 may also include any suitable device(s) (e.g., light detector 322).

In FIG. 1, the HRID 10 includes a multi-layer body 300 having a filter layer 310 and a light detector layer 320 having a light detector 322. Although the body 300 in FIG. 1 has certain layers, other embodiments may integrate, omit, or add one or more layers or change the location of one or more layers in the body 300. For example, the body 300 may omit the filter layer 310. As another example, the body 300 may include a transparent protective layer (not shown) outside the filter layer 310 to isolate the filter layer 310 and/or the light detector 322. As another example, the body 300 may include the surface element 250 as a surface layer of the body 300. In yet another example, the body 300 may include a lens 302 (shown in FIG. 3) between the surface element 250 and the filter layer 310.

The body 300 may be fabricated using standard semiconductor and micro/nanofabrication procedures. During an exemplary fabrication of an embodiment of the body 300, a filter layer 216 can be placed on top of a light detector layer 320. After fabrication, the surface element 250 can be located on top of the filter layer 310 during an imaging operation.

In FIG. 1, the filter layer 310 includes a filter 312. A filter 312 refers to any suitable device(s) (e.g., optical filters) capable of selectively transmitting light having select light properties (e.g., polarization, wavelength, frequency, intensity, phase, spin angular momentum, etc.) while substantially removing light the remaining light by any suitable method such as reflection, absorption or interference. Some examples of suitable filters include interference filters, absorption filters, etc. Any type of filter can be used such as dichroic filters, monochromatic filters, etc. In one embodiment, a polarization filter may be used.

In a photoluminescence (e.g., fluorescence or phosphorescence) imaging embodiment, the filter layer 310 can be used to transmit emissions from fluorophores in the object 200 and substantially remove excitation light. In this embodiment, the plurality of nondiffracting beams 110 provides an excitation light having an excitation wavelength that can activate fluorophores in the object 200. The activated fluorophores can emit an emission light (emissions). The emission light can be electromagnetic radiation with specific properties such that it passes through the filter 312 to the light detector 322. The resulting light data can thus be substantially associated with the emissions from the activated fluorophores in the object 200.

In FIG. 1, the light detector layer 320 includes a light detector 322. As used herein, a light detector 322 (e.g., a photosensor) refers to any suitable device capable of generating one or more signals with light data based on light received by the light detector 322. Each signal with light data may be in the form of electrical current that from the photoelectric effect. The light detector 322 can detect light having any light property (e.g., wavelength(s), phase(s), intensity(ies), frequency(ies), polarization(s), spin angular momentum(s), and/or other light properties).

The light detector 322 includes a light detector surface 323. Although not shown, the light detector 322 also includes a suitable number (e.g., 1, 100, 1000, etc.) of discrete light detecting elements (e.g., pixels). The light detecting elements can be arranged in a suitable form such as a single light detecting element, a one-dimensional array of light detecting elements, a two-dimensional array of light detecting elements, or a multiplicity of one-dimensional and/or two-dimensional arrays of light detecting elements. The arrays can be in any suitable orientation or combination of orientations. In some cases, the array(s) of light detecting elements may have the same orientation as the orientation of the plurality of nondiffracting elements 110 and are aligned to correspond to the plurality of nondiffracting beams 110. For example, the light detector 322 in FIG. 3 may include an array or arrays of light detecting elements oriented at an angle, $\alpha$ with respect to the x-axis to correspond to the array of nondiffracting beams having the same orientation.

Some examples of light detectors 322 having a single light detecting element include a photo-diode (PD), an avalanche photo-diode (APD) and a photomultiplier tubes (PMT). Some examples of light detectors 322 having one-dimensional or two-dimensional arrays include a charge coupled device (CCD) array, a complementary metal-oxide-semiconductor (CMOS) array, an APD array, a PD array, a PMT array, etc. Suitable light detectors 322 are commercially available.

Each light detecting element of the light detector 322 may be of any suitable size (e.g., 1-10 microns) and any suitable shape (e.g., circular, square, etc.). For example, a complementary metal-oxide-semiconductor (CMOS) or charge coupled device (CCD) light detecting element may be 1-10 microns and an APD or PMT light detecting element may be as large as 1-4 mm.

One or more light detecting elements in the light detector 322 may uniquely correspond to each of the nondiffracting beams 110 in some embodiments. For example, each light detecting element may correspond to a unique nondiffracting beam 110. In this example, the light detecting element may receive light associated with the corresponding nondiffracting beam 110 and generate a signal with light data associated with the light received. In another example, the light detector 322 may be a two dimensional array of light detecting elements (e.g., 100×100 array of light detecting elements) that comprises one or more sets of smaller two-dimensional arrays of light detecting elements (e.g., 100 sets of 10×10 arrays of light detecting elements). Each set (e.g., 10×10 array) can correspond to a unique nondiffracting beam 110. In this example, the each set may receive light associated with the corresponding nondiffracting beam 110 and generate a signal with light data associated with the light received.

The light detector 322 generates one or more signals with light data associated with the light received by the light detecting elements in the light detector 322. As used herein, light data refers to any suitable information related to the light received by the light detecting elements in the light detector 322. Light data may include, for example, information about the properties of the light detected such as the intensity of the light, the wavelength(s) of the light, the frequency or frequencies of the light, the polarization(s) of the light, the phase(s) of the light, the spin angular momentum(s) of the light, and/or other light properties associated with the light received. Light data may also include the location of the light detecting element receiving the light. Light data may be data based on a single time, based on multiple times, or based on a time varying basis. Time varying light data refers to light data that is based on a time varying basis. In some embodiments such as the optofluidic application shown in FIG. 4, the time varying light data may be in the form of line scans.

At any given time, the light data from the light detector 322 corresponds to a set of discrete transverse (X, Y) points (e.g., scatterers) on the object 200, with an extended depth (Z) range along the illumination paths of the nondiffracting beams 110. By using the scanning mechanism 430 to move the nondiffracting beams 110 relative to the object 200 or the object 200 relative to the nondiffracting beams 110, while continuously acquiring light data from the light detector 322, the HRID 10 can acquire light data from many to all transverse (X, Y) points of the sample with an extended depth (Z) range. In this way, the HRID 10 can acquire light data from a sample volume with the object 200. The HRID can use the light data to acquire high-resolution two-dimensional images of an object 200 in the sample with a wide field of view and an extended depth of focus.

The surface element 250 may be a component of the HRID 10 or may be separate from the HRID 10. In addition, the surface element 250 may be a layer of the body 300 or may be a separate component from the body 300. In the illustrated embodiments shown in FIGS. 1 and 3, the surface element 250 is a separate component from the body 300 that may be removably located proximal the filter layer 310 or coupled to the filter layer 310. For example, the surface element 250 may be a slide or other platform made of transparent material that can be detachably located on the body 300. In some cases, the object 200 being imaged can be held (e.g., mounted) to the surface element 250 by an attachment method (e.g., slide cover). In some cases, the surface element 250 may be a translation platform that can be moved by the scanning mechanism 430. In other embodiments, the surface element 250 may be a layer of the body 300. For example, the surface element 250 may be a surface layer of the body 300. In the illustrated embodiment shown in FIG. 4, for example, the surface element 250 is a surface layer of a fluid channel 330 in a multi-layer body 300.

The processor 410 may include any suitable processor(s) (e.g., microprocessor) that can receive signals with light data from the light detector 322 associated with the light received by the light detector 322. The processor 410 can generate a high resolution two-dimensional image of the object 200 or a portion of the object 200 based on the light data received from the light detector 322. The processor 410 executes code stored on the CRM 420 to perform some of the functions of HRID 10 such as interpreting the light data from the light detector 322, performing analyses of the light data, and generating one or more images of the object 200 based on the light data.

The CRM (e.g., memory) 420 stores code for performing some functions of the HRID 10. The code is executable by the processor 410. In some embodiments, the CRM 420 may comprise: a) code for interpreting light data received from the light detector 322, b) code for generating one or more images of the object 200 based on non-time varying light data, c) code for determining the propagation angle of one or more nondiffracting beams 110, d) code for compiling line scans or other time varying light data into a two-dimensional image of the object based on the time varying light data, e) code for displaying the generated images, f) and/or any other suitable code for performing functions of the HRID 10. The CRM 420 may also include code for performing any of the signal processing or other software-related functions that may be created by those of ordinary skill in the art. The code may be in any suitable programming language including C, C++, Pascal, etc.

The HRID 10 can be used to generate any suitable type of image such as a fluorescence image, phosphorescence image, intensity images, phase image, differential interference contrast (DIC) image, etc. The images can be black and white images, grey tone images, color images, etc.

In one embodiment, the HRID 10 can generate a photoluminescence (e.g., fluorescence or phosphorescence) image of the object 200. In this embodiment, the filter layer 310 includes any suitable device(s) (e.g., optical filter) that can reject excitation light and pass emission light from the fluorophores. The illumination source 120 (e.g., laser) provides an excitation light having an excitation wavelength that can excite fluorophores in the object 200. The excited fluorophores emit an emission light. The light data measured by the light detector 322 is associated with the emission light from the fluorophores in the object 200. The processor 410 generates image data associated with the emission light data and generates a photoluminescence image of the object 200 based on the image data.

Modifications, additions, or omissions may be made to HRID 10 without departing from the scope of the disclosure. For example, the HRID 10 may omit the filter layer 132 in embodiments of the HRID 10 which do not perform photoluminescence imaging. As another example, other embodiments of the HRID 10 may include a display communicatively coupled to the processor 410 to receive output data such as image data and provide output such as an image or image data to a user of the HRID 10. In addition, the components of HRID 10 may be integrated or separated according to particular needs. For example, the processor 410 or other suitable processor may be integrated into the light detector 322 so that the light detector 322 can perform one or more of the functions of the processor 410 in some embodiments. As another example, the processor 410 and/or CRM 420 may be components of a computer, which is separate from the HRID 10 or a component of the HRID 10. As another example, the processor 410 and/or CRM 20 may be separate from the HDID 10.

B. Projection Imaging

In projection imaging embodiments, the HRID 10 further includes a lens between the filter layer and the surface element 250 to project the image of the illuminated regions of the object 200 onto the light detector 322. In these embodiments, the lens may be added to provide a physical barrier or protective layer between the light detector 322 and the surface element 250 or liquid sample having the object 200. The focusing of the lens 302 can compensate for diffraction that may occur due to the increased separation of the light detector 322. Without the focusing of the lens 302, the light may diffract in the increased separation and the light detector 322 may provide less accurate light data, especially if the light is based on weak photoluminescence emissions in a photoluminescence imaging embodiment.

FIG. 3 is a schematic drawing of components of a HRID 10 in a projection imaging scheme, according to embodiments of the invention. The HRID 10 includes a beam generator 100 having an illumination source 120 providing an excitation beam 130 and a holographic element 140 generating the plurality of nondiffracting beams 110 when illuminated by the excitation beam 130. The beam generator 100 also includes a beam generator surface 102. The HRID 10 also includes a surface element 250 having a first surface 252. The HRID 10 also includes a body 300 having a lens layer 301 with a lens 302, a filter layer 310 having a filter 312, and a light detector layer 320 having a light detector 322. An object 200 being imaged is located between the surface element 250 and the beam generator 100 of the HRID 10. In other embodiments, the object 200 may have another suitable location between the surface element 250 and the beam generator 100 of the HRID 10. For example, the object 200 may be located proximal the first surface 252 of the surface element 250 in some embodiments. The HRID 10 also includes a processor 410 communicatively coupled to the light detector 322, and a computer readable medium 420 communicatively coupled to the processor 410, and a scanning mechanism 430 capable of moving the nondiffracting beams 110 relative to the object 200 or the object 200 relative to the nondiffracting beams 110.

The HRID 10 also includes an x-axis, a y-axis, and a z-axis. The x-axis and y-axis lie in the plane of the first surface 252 of the surface element 250. The z-axis is orthogonal to this plane.

In a general operation, the HRID 10 in FIG. 3 illuminates the object 200 with the plurality of nondiffracting beams 110 that propagate through the object 200 with a constant spot size or substantially constant spot size. The object 200 is then imaged on the light detector 322 with a lens 302 having a small numerical aperture. The lens 302 projects the image of the illuminated regions of the object 200 onto the light detector 322 (projection imaging). By using the scanning mechanism 430 to scan the object 200 through the plurality of nondiffracting beams 110 or the nondiffracting beams 110 through the object 200, the HRID 10 has the ability to acquire high resolution images of large sample volumes.

The lens 302 can be any lens with suitable properties. Suitable lenses are commercially available. In many projection imaging embodiments, the lens 302 has a numerical aperture (NA) smaller than that of the nondiffracting beams 110 such that the depth of field of the lens 302 may match or exceed the maximum nondiffracting depth of field (range) of the nondiffracting beams 110. That is, because the NA of the lens 302 is smaller than that of the nondiffracting beam 110, it's depth of field can be high enough to image the entire length of the nondiffracting beam 110 in focus. In one such embodiment, the lens 302 is located so that its object plane (focal plane) is half way through the depth of field of the nondiffracting beams 110. When a lens 302 with a NA smaller than the nondiffracting beams 110 is in this location, the entire thickness of the object 200 illuminated by the beam generator 100 can be imaged sharply in focus on the light detector 110. Although a single lens 302 is described in certain projecting imaging embodiments, any suitable number of lenses can be used in other embodiments.

As mentioned above, the image resolution provided by the HRID 10 is based on the spot size of the nondiffracting beams 110. The image resolution is not based on the resolution of the lens 302. For this reason, the HRID 10 can use a lens 302 with a low numerical aperture and a resolution as large as the distance between adjacent nondiffracting beams 110 in the plurality of nondiffracting beams 110 without substantially affecting the high resolution capability of the HRID 10. Using a lens 302 with a low numerical aperture can also provide the advantage of allowing the HRID 10 to acquire aberration-free images of a much larger region of the sample/specimen than would be possible with a traditional microscope having a similar resolution.

In FIG. 3, the beam generator 100 generates a plurality of nondiffracting beams 110 (e.g., Bessel beams). Each nondiffracting beam 110 has little to no diffraction with propagation. For example, as each nondiffracting beam 110 propagates, the nondiffracting beam 110 does not substantially diffract and maintains a tight focus confining photons within a narrow width and sustaining constant width over a relatively long section of the beam's axis.

The nondiffracting beam 110 can have any suitable light property (intensity, phase, etc.) and any suitable size (spot size, length, etc.). For example, the nondiffracting beam 110 may have a substantially constant spot size of less than a micron in diameter (e.g., submicron size). As another example, the nondiffracting beam 110 may have a length of 250 microns or greater. An illustrated example of a Bessel beam having a length of approximately 200 microns is shown in FIG. 2(a).

Generally, the plurality of nondiffracting beams 110 of embodiments can include any suitable number of nondiffracting beams 110 (e.g., 1, 50, 100, 200, 1000, etc.) in any suitable arrangement (e.g., a two-dimensional array, a three-dimensional array, and a multiplicity of one-dimensional, two-dimensional, and/or three-dimensional arrays of any suitable dimensions) having any suitable orientation or combination of orientations. In the illustrated example shown in FIG. 3, the plurality of nondiffracting beams 110 is arranged in a two-dimensional array having 7×4 dimensions and that is oriented along (aligned with) the x-axis. In other embodiments, the plurality of nondiffracting beams 110 may be in another arrangement or may have other dimensions (e.g., 200×1, 200×100, 1000×200, 20×10, etc.) and/or different orientation(s).

Each of the nondiffracting beams 110 has an illumination path which lies substantially along a line. In FIG. 3, the plurality of nondiffracting beams 110 lie in the z-direction and have illumination paths that lie substantially along z-directional lines at a set of discrete transverse (X, Y) locations across a portion of the surface element 250. In other embodiments, the nondiffracting beams 110 may lie at an angle to the z-axis.

In FIG. 3, the beam generator 100 includes a holographic element (e.g., holographic plate) 140 in communication with an illumination source (e.g., laser) 130 providing an excitation beam 130 (e.g., plane wave excitation beam). The holographic element 140 generates the plurality of nondiffracting beams 110 upon being illuminated by the excitation beam 130. In other embodiments, another suitable device or combination of devices can be used to generate the plurality of nondiffracting beams 110. Some examples of suitable devices are described in Section III below.

The illumination source 120 may be any suitable device(s) capable of providing an excitation beam 130. Some examples of suitable devices include light-emitting diodes (LEDs), laser of suitable wavelength, broadband source (e.g., mercury lamp, halogen lamp, etc.) with a suitable filter, natural light, etc. Suitable illumination sources are commercially available. The illumination source 120 may be placed in any location and at any orientation that allows it to generate an appropriate excitation beam 130 at the holographic element 140. The illumination source 120 may provide an appropriate excitation beam 130 of a suitable wavelength, intensity, phase, polarization, spin angular momentum or other light property, and spatial distribution. The illumination source 120 may provide a coherent, incoherent, or partially coherent excitation beam 130. In exemplary fluorescence/phosphorescence embodiments, the illumination source 120 provides excitation light having a first light property (e.g., first wavelength) matching the excitation wavelength of the fluorophores in an object 200 being imaged by the HRID 10. The fluorophores are excited by the excitation light and emit light (emissions) of a second light property (e.g., second wavelength). Some examples of suitable excitation light include fluorescence, 2-photon or higher order fluorescence, Raman, second harmonic or higher order, or other emission mechanism that results in emissions at a different wavelength or other different light property than the excitation light. Although the illumination source 120 in FIG. 1 is a component of the HRID 10, the illumination source 120 may be separate from the HRID 10 in other embodiments.

In FIG. 3, the holographic element 140 is a CGH capable of capable of converting an excitation beam 130 (e.g., planar wave excitation beam) from an illumination source 120 into the plurality of nondiffracting beams 110. The holographic element 140 can be made of any suitable material or materials. Some examples of suitable holographic materials include photographic emulsions, dichromated gelatin, and photoresists. The holographic element 140 can have any suitable dimensions (e.g., 1 mm×1 mm, 2 mm×2 mm, 5 mm×2 mm, 10 mm×10 mm, 10 mm×50 mm, etc.). In the case of a optically recorded hologram, the holographic element 140 can be made using any holographic recording technique capable of encoding (recording) data about the plurality of nondiffracting beams 110. Some examples of suitable holographic recording techniques include in-line (Gabor) and off-axis (Leith-Upatnieks). To play back the recording, the holographic element 140 can be illuminated by an excitation beam 130 having the same wavelength, same spatial distribution, but not necessarily the same intensity, as the reference beam used to record the holographic element 140. In many embodiments, the holographic element 140 is a CGH that is designed to generate a plurality of well-separated nondiffracting beams 110 upon being illuminated by a plane wave excitation beam 130. Some examples of suitable CGHs are described in Section III below.

The scanning mechanism 430 can include any suitable device (e.g., raster scanner) or structural element (e.g., fluid channel) capable of moving the object 200 or surface element 250 holding the object 200 relative to the plurality of nondiffracting beams 110 or moving the plurality of nondiffracting beams 110 relative to the object 200. Although the scanning mechanism 430 is a component of the HRID 10 in illustrated embodiments, the scanning mechanism 430 may be separate from the HRID 10 in other embodiments. Although not shown, the scanning mechanism 430 can be associated with the beam generator 100, the object 200, or the surface element 250 (e.g., a slide holding an object 200).

In some embodiments, the scanning mechanism 430 can be associated with one or more components of the beam generator 100. For example, the scanning mechanism 430 can be associated with the holographic element 140 of the beam generator 100 to be able to move the plurality of nondiffracting beam 110 through a volume of the object 200.

In some embodiments, the scanning mechanism 430 can be associated with the object 200 such that it is able to move the object 200 being imaged relative to the plurality of nondiffracting beams 110. For example, the scanning mechanism 320 can be an optical tweezer that can move the object 200 relative to the plurality of nondiffracting beams 110. As another example, the scanning mechanism 430 can be similar to the scanning mechanism as used in optofluidic microscopy, where an image is acquired as an object 200 moves in a fluid flow through a fluid channel 330 as shown in FIG. 4. An example of a scanning mechanism used in optofluidic microscopy can be found in X. Heng, D. Erickson, L. R. Baugh, Z. Yaqoob, P. W. Sternberg, D. Psaltis, and C. H. Yang, "Optofluidic microscopy—a method for implementing a high resolution optical microscope on a chip," Lab on a Chip 6, 1274-1276 (2006), which is hereby incorporated by reference in its entirety for all purposes.

In some embodiments, the scanning mechanism 430 can be associated with the surface element 250 (e.g., slide or other translational platform). For example, the scanning mechanism 430 can be coupled to the surface element 250 and the surface element 250 can hold the object 200 such that it is able to move the object 200 being imaged relative to the plurality of nondiffracting beams 110.

Any suitable object 200, objects 200, or portion of an object 200 may be imaged by the HRID 10. In many embodiments, the HRID 10 images an object 200 within a specimen (sample) introduced to the HRID 10. For example, a specimen with objects 200 may be located on the surface element 250 (e.g., a slide) and the surface element 250 placed on the body 300 of the HRID 10 for imaging of the objects 200. Suitable objects 200 can be biological or inorganic entities. Examples of biological entities include whole cells, cell components, microorganisms such as bacteria or viruses, cell components such as proteins, etc. Inorganic entities may also be imaged by embodiments of the invention. Examples of inorganic entities include mineral fibers, and crystals. The object 200 can have any thickness.

In many embodiments, the plurality of nondiffracting beams 110 can illuminate through the entire depth of the sample having one or more objects 200. By implementing the scanning mechanism 430, a sample (specimen) volume can be illuminated by the plurality of nondiffracting beams 110. The sample volume may include a portion of an object volume, or one or more object volumes. In many embodiments, the entire sample volume including the volume of one or more objects 200 may be illuminated by the plurality of nondiffracting beams 110.

In FIG. 3, The HRID 10 includes a multi-layer body 300 comprising a lens layer 301 with a lens 302, a filter layer 310 having a filter 312, and a light detector layer 320 having a light detector 322. The layers or made of suitable material(s) and thickness(es). Although FIG. 3 shows a multi-layer body 300, the body 300 may be a single, monolithic structure in other embodiments. Also, although the body 300 in FIG. 3 has certain layers, other embodiments may integrate, omit, or add one or more layers or change the location of one or more layers in the body 300. For example, the body 300 may omit the filter layer 310 in non-photoluminescence applications. As another example, the body 300 may include a transparent protective layer (not shown) outside the filter layer 310 to isolate the filter layer 310 and/or the light detector 322. As another example, the body 300 may include the surface element 250 as a surface layer of the body 300. In yet another example, the body 300 may include a lens 302 (shown in FIG. 3) between the surface element 250 and the filter layer 310.

The body 300 may be fabricated using standard semiconductor and micro/nanofabrication procedures. During an exemplary fabrication of an embodiment of the body 300, a filter layer 216 can be placed on top of a light detector layer 320. Then, the lens layer 301 with the lens 302 can be placed on top of the filter layer 312. After fabrication, the surface element 250 can be located on top of the filter layer 310 during an imaging operation.

In FIG. 3, the filter layer 310 includes a filter 312 (e.g., interference filter, absorption filter, etc.) capable of selectively transmitting light having select light properties (e.g., polarization, wavelength, frequency, intensity, phase, spin angular momentum, etc.) while substantially removing light the remaining light by any suitable method such as reflection, absorption or interference. Some examples of suitable devices include filters (e.g., interference filters, absorption filters, etc.). Any type of filter can be used such as dichroic filters, monochromatic filters, etc. In one embodiment, a polarization filter may be used.

In a photoluminescence (e.g., fluorescence or phosphorescence) imaging embodiment, the filter layer 310 can be used to transmit emissions from fluorophores in the object 200 and substantially remove excitation light. In this embodiment, the plurality of nondiffracting beams 110 provides an excitation light having an excitation wavelength that can activate fluorophores in the object 200. The activated fluorophores can emit an emission light (emissions). The emission light can be electromagnetic radiation with specific properties such that it passes through the filter 312 to the light detector 322. The resulting light data can thus be substantially associated with the emissions from the activated fluorophores in the object 200.

In FIG. 3, the light detector layer 320 includes a light detector 322 capable of generating one or more signals with light data based on light received by the light detector 322. Each signal with light data may be in the form of electrical current that from the photoelectric effect. The light detector 322 can detect light having any light property (e.g., wavelength(s), phase(s), intensity(ies), frequency(ies), polarization(s), spin angular momentum(s), and/or other light properties).

The light detector 322 includes a light detector surface 323. Although not shown, the light detector 322 also includes a number (e.g., 1, 100, 1000, etc.) of discrete light detecting elements (e.g., pixels). The light detecting elements can be arranged in a suitable form such as a single light detecting element, a one-dimensional array of light detecting elements, a two-dimensional array of light detecting elements, or a multiplicity of one-dimensional and/or two-dimensional arrays of light detecting elements. The arrays can be in any suitable orientation or combination of orientations (e.g., oriented along the x-axis, oriented at an angle with respect to the x-axis, etc.). In some cases, the array(s) of light detecting elements may have the same orientation as the orientation of the plurality of nondiffracting elements 110 and/or are aligned to correspond to the plurality of nondiffracting beams 110.

Some examples of light detectors 322 having a single light detecting element include a photo-diode (PD), an avalanche photo-diode (APD) and a photomultiplier tubes (PMT). Some examples of light detectors 322 having one-dimensional or two-dimensional arrays include a charge coupled device (CCD) array, a complementary metal-oxide-semiconductor (CMOS) array, an APD array, a PD array, a PMT array, etc. Suitable light detectors 322 are commercially available.

Each light detecting element of the light detector 322 may be of any suitable size (e.g., 1-10 microns) and any suitable shape (e.g., circular, square, etc.). For example, a complementary metal-oxide-semiconductor (CMOS) or charge coupled device (CCD) light detecting element may be 1-10 microns and an APD or PMT light detecting element may be as large as 1-4 mm.

One or more light detecting elements in the light detector 322 may uniquely correspond to each of the nondiffracting beams 110 in some embodiments. For example, each light detecting element may correspond to a unique nondiffracting beam 110. In this example, the light detecting element may receive light associated with the corresponding nondiffracting beam 110 and generate a signal with light data associated with the light received. In another example, the light detector 322 may be a two dimensional array of light detecting elements (e.g., 100×100 array of light detecting elements) that comprises one or more sets of smaller two-dimensional arrays of light detecting elements (e.g., 100 sets of 10×10 arrays of light detecting elements). Each set (e.g., 10×10 array) can uniquely correspond to a nondiffracting beam 110. In this example, the each set may receive light associated with the corresponding nondiffracting beam 110 and generate a signal with light data associated with the light received.

In FIG. 3, the light detector 322 generates one or more signals with light data associated with the light received by the light detecting elements in the light detector 322. Light data may include, for example, information about the properties of the light detected such as the intensity of the light, the wavelength(s) of the light, the frequency or frequencies of the light, the polarization(s) of the light, the phase(s) of the light, the spin angular momentum(s) of the light, and/or other light properties associated with the light received. Light data may also include the location of the light detecting element receiving the light. Light data may be data based on a single time, based on multiple times, or based on a time varying basis. Time varying light data refers to light data that is based on a time varying basis.

At any given time, the light data from the light detector 322 corresponds to a set of discrete transverse (X, Y) points (e.g., scatterers) on the object 200, with an extended depth (Z) range along the illumination paths of the nondiffracting beams 110. By using the scanning mechanism 430 to move the nondiffracting beams 110 relative to the object 200 or the object 200 relative to the nondiffracting beams 110, while continuously acquiring light data from the light detector 322, the HRID 10 can acquire light data from many to all transverse (X, Y) points of the sample with an extended depth (Z) range. IN this way, the HRID 10 can acquire light data from a sample volume with the object 200. The HRID can use the light data to acquire high-resolution two-dimensional images of an object 200 in the sample with a wide field of view and an extended depth of focus.

The surface element 250 may be a component of the HRID 10 or may be separate from the HRID 10. In addition, the surface element 250 may be a layer of the body 300 or may be a separate component from the body 300. In the illustrated embodiments shown in FIGS. 1 and 3, the surface element 250 is a separate component from the body 300 that may be removably located proximal the filter layer 310 or coupled to the filter layer 310. For example, the surface element 250 may be a slide or other platform made of transparent material that can be detachably located on the body 300. In some cases, the object 200 being imaged can be held (e.g., mounted) to the surface element 250 by an attachment method (e.g., slide cover). In some cases, the surface element 250 may be a translation platform that can be moved by the scanning mechanism 430. In other embodiments, the surface element 250 may be a layer of the body 300. For example, the surface element 250 may be a surface layer of the body 300. In the illustrated embodiment shown in FIG. 4, for example, the surface element 250 is a surface layer of a fluid channel 330 in a multi-layer body 300.

The processor 410 may include any suitable processor(s) (e.g., microprocessor) that can receive signals with light data from the light detector 322 associated with the light received by the light detector 322. The processor 410 can generate a high resolution two-dimensional image of the object 200 or a portion of the object 200 based on the light data received from the light detector 322. The processor 410 executes code stored on the CRM 420 to perform some of the functions of HRID 10 such as interpreting the light data from the light detector 322, performing analyses of the light data, and generating one or more images of the object 200 based on the light data.

The CRM (e.g., memory) 420 stores code for performing some functions of the HRID 10. The code is executable by the processor 410. In some embodiments, the CRM 420 may comprise: a) code for interpreting light data received from the light detector 322, b) code for generating one or more images of the object 200 based on non-time varying light data, c) code for determining the propagation angle of one or more nondiffracting beams 110, d) code for compiling line scans or other time varying light data into a two-dimensional image of the object based on the time varying light data, e) code for displaying the generated images, f) and/or any other suitable code for performing functions of the HRID 10. The CRM 420 may also include code for performing any of the signal processing or other software-related functions that may be created by those of ordinary skill in the art. The code may be in any suitable programming language including C, C++, Pascal, etc.

The HRID 10 can be used to generate any suitable type of image such as a fluorescence image, phosphorescence image, intensity images, phase image, differential interference contrast (DIC) image, etc. The images can be black and white images, grey tone images, color images, etc.

In one embodiment, the HRID 10 can generate a photoluminescence (e.g., fluorescence or phosphorescence) image of the object 200. In this embodiment, the filter layer 310 includes any suitable device(s) (e.g., optical filter) that can reject excitation light and pass emission light from the fluorophores. The illumination source 120 (e.g., laser) provides an excitation light having an excitation wavelength that can excite fluorophores in the object 200. The excited fluorophores emit an emission light. The light data measured by the light detector 322 is associated with the emission light from the fluorophores in the object 200. The processor 410 generates image data associated with the emission light data and generates a photoluminescence image of the object 200 based on the image data.

Modifications, additions, or omissions may be made to HRID 10 without departing from the scope of the disclosure. For example, the HRID 10 may omit the filter layer 132 in embodiments of the HRID 10 which do not perform photoluminescence imaging. As another example, other embodiments of the HRID 10 may include a display communicatively coupled to the processor 410 to receive output data such as image data and provide output such as an image or image data to a user of the HRID 10. In addition, the components of HRID 10 may be integrated or separated according to particular needs. For example, the processor 410 or other suitable processor may be integrated into the light detector 322 so that the light detector 322 can perform one or more of the functions of the processor 410 in some embodiments. As another example, the processor 410 and/or CRM 420 may be components of a computer, which is separate from the HRID 10 or a component of the HRID 10. As another example, the processor 410 and/or CRM 20 may be separate from the HDID 10.

C. Optofluidic Application

In optofluidic embodiments, an HRID 10 uses optofluidic flow as a scanning mechanism to provide a highly compact, inexpensive, and robust device with highly automatable, high-throughput, high-resolution imaging with wide field and extended focus. In these embodiments, the HRID 10 acquires an image of an object 200 as the object 200 moves in a fluid flow through a fluid channel (optofluidic application). Either direct imaging or projection imaging schemes can be employed in these embodiments.

FIG. 4 is a schematic drawing of components of a HRID 10 using optofluidic flow as a scanning mechanism and employs the direct imaging scheme to generate two-dimensional high resolution images of an object 200, according to embodiments of the invention. The HRID 10 includes a beam generator 100 having an illumination source 120 providing an excitation beam 130, a holographic element 140 generating the plurality of nondiffracting beams 110 when illuminated by the excitation beam 130, and a beam generator surface 102. The plurality of nondiffracting beam 110 is in the form of a one-dimensional array. An object 200 being imaged is located between the surface element 250 and the beam generator 100. The HRID 10 also includes a body 300. The body 300 includes the holographic element 140, a surface element 110 having a first surface 252, a filter layer 310 having a filter 312 and a light detector layer 320 having a light detector 322. The body 300 also defines or includes a fluid channel 300 having a longitudinal axis. The HRID 10 also includes a processor 410 communicatively coupled to the light detector 322, and a computer readable medium 420 communicatively coupled to the processor 410.

The HRID 10 also includes an x-axis, a y-axis, and a z-axis. The x-axis and y-axis lie in the plane of the first surface 252 of the surface element 250. The z-axis is orthogonal to this plane.

In FIG. 4, the beam generator 100 generates a plurality of nondiffracting beams 110 (e.g., Bessel beams) in the form of a one-dimensional array 111. Each nondiffracting beam 110 has little to no diffraction with propagation. For example, as each nondiffracting beam 110 propagates, the nondiffracting beam 110 does not substantially diffract and maintains a tight focus confining photons within a narrow width and sustaining constant width over a relatively long section of the beam's axis.

Figure 2:
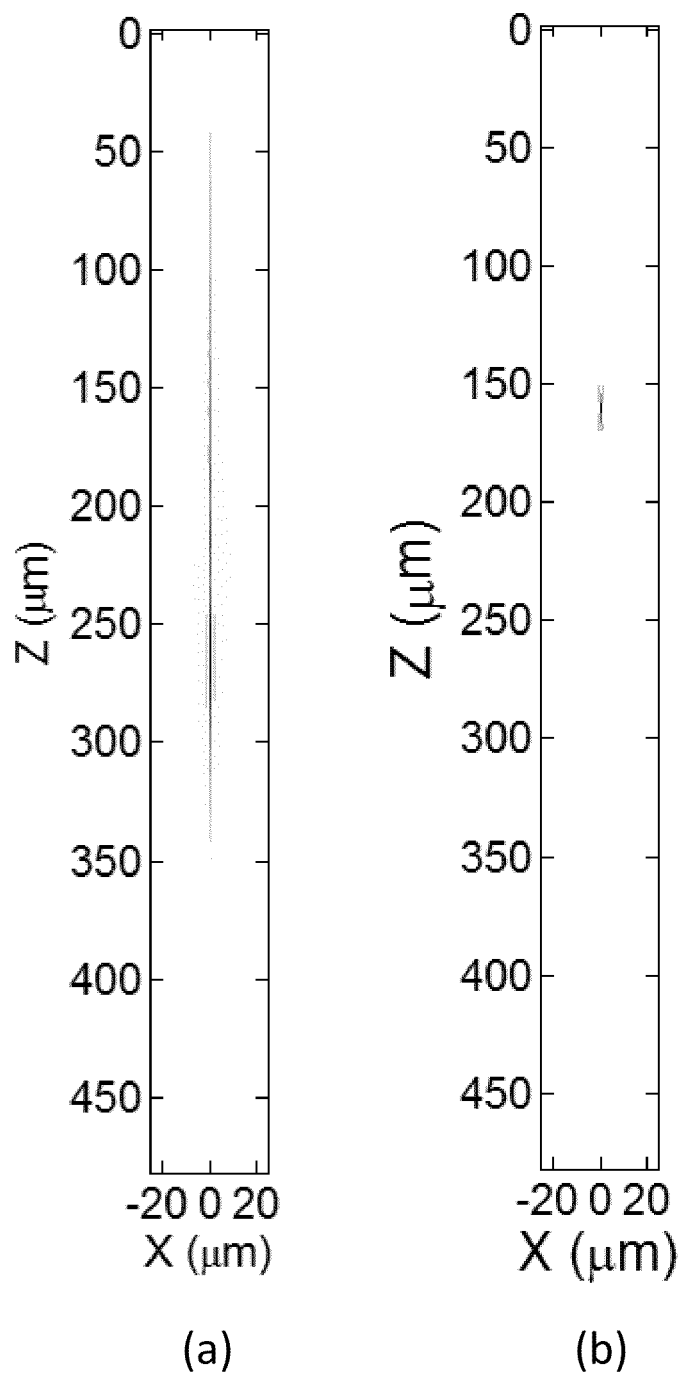
FIG. 2(a) is an intensity graph of a slice in an XZ plane of a Bessel beam (i.e., example of a nondiffracting beam), according to embodiments of the invention.
FIG. 2(b) is an intensity graph of a slice in the XZ plane of a focusing spherical wave with a 0.3 numerical aperture, according to embodiments of the invention.

The nondiffracting beam 110 can have any suitable light property (intensity, phase, etc.) and any suitable size (spot size, length, etc.). For example, the nondiffracting beam 110 may have a substantially constant spot size of less than a micron in diameter (e.g., submicron size). As another example, the nondiffracting beam 110 may have a length of 250 microns or greater. An illustrated example of a Bessel beam having a length of approximately 200 microns is shown in FIG. 2($a$).

In FIG. 4, the plurality of nondiffracting beams 110 is arranged in a one-dimensional array having 29×1 dimensions and is oriented at an angle, $\alpha$ with respect to the x-axis. The nondiffracting beams 110 in the array, as a group, substantially extend from the first lateral side 336 to the second lateral side 338 of the fluid channel 330. In other embodiments, other suitable number of nondiffracting beams 110 can be used (e.g., 1, 50, 100, 200, 1000, etc.) and/or other suitable arrangements (e.g., a two-dimensional array, a three-dimensional array, and a multiplicity of one-dimensional, two-dimensional, and/or three-dimensional arrays of any suitable dimensions) can be used. In addition, the arrays of other embodiments can have another suitable orientation or orientations.

Each of the nondiffracting beams 110 has an illumination path which lies substantially along a line. In FIG. 4, the nondiffracting beams 110 lie in the z-direction and have illumination paths that lie substantially along z-directional lines at a set of discrete transverse (X, Y) locations across a portion of the surface element 250. In other embodiments, the nondiffracting beams 110 may lie at an angle to the z-axis.

In FIG. 4, the beam generator 100 includes a holographic element (e.g., holographic plate) 140 in communication with an illumination source (e.g., laser) 130 providing an excitation beam 130 (e.g., plane wave excitation beam). The holographic element 140 generates the plurality of nondiffracting beams 110 upon being illuminated by the excitation beam 130. In other embodiments, another suitable device or combination of devices can be used to generate the plurality of nondiffracting beams 110. Some examples of suitable devices are described in Section III below.

The illumination source 120 in FIG. 4 may be any suitable device(s) capable of providing an excitation beam 130. Some examples of suitable devices include light-emitting diodes (LEDs), laser of suitable wavelength, broadband source (e.g., mercury lamp, halogen lamp, etc.) with a suitable filter, natural light, etc. Suitable illumination sources are commercially available. The illumination source 120 may be placed in any location and at any orientation that allows it to generate an appropriate excitation beam 130 at the holographic element 140. The illumination source 120 may provide an appropriate excitation beam 130 of a suitable wavelength, intensity, phase, polarization, spin angular momentum or other light property, and spatial distribution. The illumination source 120 may provide a coherent, incoherent, or partially coherent excitation beam 130. In exemplary fluorescence/phosphorescence embodiments, the illumination source 120 provides excitation light having a first light property (e.g., first wavelength) matching the excitation wavelength of the fluorophores in an object 200 being imaged by the HRID 10. The fluorophores are excited by the excitation light and emit light (emissions) of a second light property (e.g., second wavelength). Some examples of suitable excitation light include fluorescence, 2-photon or higher order fluorescence, Raman, second harmonic or higher order, or other emission mechanism that results in emissions at a different wavelength or other different light property than the excitation light. Although the illumination source 120 in FIG. 1 is a component of the HRID 10, the illumination source 120 may be separate from the HRID 10 in other embodiments.

In FIG. 4, the holographic element 140 is a CGH capable of converting an excitation beam 130 (e.g., plane wave excitation beam) from an illumination source 120 into the plurality of nondiffracting beams 110. The holographic element 140 can be made of any suitable material or materials. Some examples of suitable holographic materials include photographic emulsions, dichromated gelatin, and photoresists. The holographic element 140 can have any suitable dimensions (e.g., 1 mm×1 mm, 2 mm×2 mm, 5 mm×2 mm, 10 mm×10 mm, 10 mm×50 mm, etc.). In the case of a optically recorded hologram, the holographic element 140 can be made using any holographic recording technique capable of encoding (recording) data about the plurality of nondiffracting beams 110. Some examples of suitable holographic recording techniques include in-line (Gabor) and off-axis (Leith-Upatnieks). To play back the recording, the holographic element 140 can be illuminated by an excitation beam 130 having the same wavelength, same spatial distribution, but not necessarily the same intensity, as the reference beam used to record the holographic element 140. In many embodiments, the holographic element 140 is a CGH that is designed to generate a plurality of well-separated nondiffracting beams 110 upon being illuminated by a plane wave excitation beam 130. Some examples of suitable CGHs are described in Section III below.

In optofluidic embodiments, the scanning mechanism 430 includes the structural elements of the fluid channel 330 having a fluid flow for moving the object 200 being imaged relative to the plurality of nondiffracting beams 110. In these embodiments, the scanning mechanism 430 is similar to the scanning mechanism used in optofluidic microscopy, where an image is acquired as an object 200 moves in a fluid flow through a fluid channel 330. An example of a scanning mechanism used in optofluidic microscopy can be found in X. Heng, D. Erickson, L. R. Baugh, Z. Yaqoob, P. W. Sternberg, D. Psaltis, and C. H. Yang, "Optofluidic microscopy—a method for implementing a high resolution optical microscope on a chip," Lab on a Chip 6, 1274-1276 (2006).

Any suitable object 200, objects 200, or portion of an object 200 may be imaged by the HRID 10. Typically, the HRID 10 images an object 200 within a fluid sample introduced into the fluid channel 330 of the HRID 10. Suitable objects 200 can be biological or inorganic entities. Examples of biological entities include whole cells, cell components, microorganisms such as bacteria or viruses, cell components such as proteins, etc. Inorganic entities may also be imaged by embodiments of the invention. Examples of inorganic entities include mineral fibers, and crystals. The object 200 can have any thickness.

In FIG. 4, the plurality of nondiffracting beams 110 can illuminate through the entire depth of the fluid channel 330 and the object 200 in the fluid channel 330. Using the fluid flow to carry the fluid sample through the plurality of nondiffracting beams 110, a fluid sample volume can be illuminated by the plurality of nondiffracting beams 110. The fluid sample volume may include at least a portion of the volume of the object 200 being imaged. In many embodiments, the entire sample volume including the volume of the object 200 may be illuminated by the plurality of nondiffracting beams 110.

In FIG. 4, the HRID 10 includes a multi-layer body 300 comprising a holographic element 140, a surface element 250, a filter layer 310 having a filter 312 and a light detector layer 320 having a light detector 322. Although FIG. 4 shows a multi-layer body 300, the body 300 may be a single, monolithic structure in other embodiments. In the illustrated optofluidic example of FIG.4, the surface element 250 is a surface layer (e.g., transparent surface layer) of the body 300. The layers of the body 300 may be of any suitable material or combination of materials having any suitable thickness or thicknesses. The layers of the body 300 may also include any suitable device (e.g., light detector 322) or structural element such as a fluid channel 330.

The body 300 also defines or includes a fluid channel 330. The fluid channel 330 can have a fluid flow moving the object 200 being imaged through one or more of the nondiffracting beams 110. The fluid channel 330 has a first channel surface 332 and a second channel surface 334 on opposite sides of the fluid channel 330. In the illustrated example, the first channel surface 332 is coincident with the first surface 252 of the surface element 250 and the second channel surface 334 is coincident with the beam generator surface 102. In other embodiments, a transparent layer may lie between the first surface 252 and the first channel surface 332 and/or a transparent layer may lie between the beam generator surface 102 and the second channel surface 334. In FIG. 4, the fluid channel 330 also has a first lateral side 336 and a second lateral side 338 opposing the first lateral side.

The fluid channel 330 may have any suitable dimensions. For example, the width and/or depth of the fluid channel 330 may each be less than about 10 microns, 5 microns, or 1 micron. In some cases, the fluid channel 330 may be sized based on the size of the object 200 being imaged by the HRID 10. The fluid channel 330 can also have any suitable cross-sectional shape (e.g., oval, rectangle, square, etc.). In the illustrated embodiment, the nondiffracting beams propagate through the depth of the fluid channel 330.

In an optofluidic application, the fluid flow in the fluid channel 330 is generally in the direction of the x-axis along a longitudinal axis of the fluid channel 330. Any suitable technique may be used for providing fluid flow and particulate transport of the objects 200 in the fluid channel 330 of these embodiments. Some convention techniques include pressure drive flow, electrokinetic transport, discrete droplet translocation via electrowetting, or thermocapilarity techniques. Other techniques may include gravity drive flow, hydrodynamic focusing, dielectrophoresis, and optical tweezing. Any suitable control device(s) may be used to control the flow of fluid and/or movement of the object 200 through the fluid channel 330. Some examples of suitable control devices include micropumps, direct current (DC) electrokinetic devices, dielectrophoresis electrodes, and/or hydrodynamic focusing channels.

In FIG. 4, the filter layer 310 includes a filter 312 (e.g., interference filter, absorption filter, etc.) capable of selectively transmitting light having select light properties (e.g., polarization, wavelength, frequency, intensity, phase, spin angular momentum, etc.) while substantially removing light the remaining light by any suitable method such as reflection, absorption or interference. Some examples of suitable devices include filters (e.g., interference filters, absorption filters, etc.). Any type of filter can be used such as dichroic filters, monochromatic filters, etc. In one embodiment, a polarization filter may be used.

In a photoluminescence (e.g., fluorescence or phosphorescence) imaging embodiment, the filter layer 310 can be used to transmit emissions from fluorophores in the object 200 and substantially remove excitation light. In this embodiment, the plurality of nondiffracting beams 110 provides an excitation light having an excitation wavelength that can activate fluorophores in the object 200. The activated fluorophores can emit an emission light (emissions). The emission light can be electromagnetic radiation with specific properties such that it passes through the filter 312 to the light detector 322. The resulting light data can thus be substantially associated with the emissions from the activated fluorophores in the object 200.

In FIG. 4, the light detector layer 320 includes a light detector 322 capable of generating one or more signals with light data based on light received by the light detector 322. Each signal with light data may be in the form of electrical current that from the photoelectric effect. The light detector 322 includes a light detector surface 323. The light detector 322 can detect light having any light property (e.g., wavelength(s), phase(s), intensity(ies), frequency(ies), polarization(s), spin angular momentum(s), and/or other light properties).

Although not shown, the light detector 322 includes a suitable number (e.g., 1, 100, 1000, etc.) of discrete light detecting elements (e.g., pixels). The light detecting elements can be arranged in a suitable form such as a single light detecting element, a one-dimensional array of light detecting elements, a two-dimensional array of light detecting elements, or a multiplicity of one-dimensional and/or two-dimensional arrays of light detecting elements. The arrays can be in any suitable orientation or combination of orientations (e.g., oriented along the x-axis, oriented at the angle with respect to the x-axis, etc.). In some cases, the array(s) of light detecting elements may have the same orientation as the orientation of the plurality of nondiffracting elements 110 and/or are aligned to correspond to the plurality of nondiffracting beams 110. For example, the light detector 322 in FIG. 4 may include an array or arrays of light detecting elements oriented at an angle, $\alpha$ with respect to the x-axis to correspond to the one-dimensional array 111 of nondiffracting beams having the same orientation.

Some examples of light detectors 322 having a single light detecting element include a photo-diode (PD), an avalanche photo-diode (APD) and a photomultiplier tubes (PMT). Some examples of light detectors 322 having one-dimensional or two-dimensional arrays include a charge coupled device (CCD) array, a complementary metal-oxide-semiconductor (CMOS) array, an APD array, a PD array, a PMT array, etc. Suitable light detectors 322 are commercially available.

Each light detecting element of the light detector 322 may be of any suitable size (e.g., 1-10 microns) and any suitable shape (e.g., circular, square, etc.). For example, a complementary metal-oxide-semiconductor (CMOS) or charge coupled device (CCD) light detecting element may be 1-10 microns and an APD or PMT light detecting element may be as large as 1-4 mm.

In some optofluidic embodiments, one or more light detecting elements in the light detector 322 may uniquely correspond to a nondiffracting beam 110 in the one-dimensional array. For example, one or more light detecting elements located at a distance from the y-axis may uniquely correspond to the nondiffracting beam 110 located at the distance from the y-axis. As another example, one or more light detecting elements located within a range of distances from the y-axis may uniquely correspond to the nondiffracting beam 110 located within that range of distances from the y-axis. In these cases, the light detecting element may receive light associated with the corresponding nondiffracting beam 110 and generate a signal with light data associated with the light received. In another example, the light detector 322 may be a two dimensional array of light detecting elements (e.g., 100×29 array of light detecting elements) that comprises sets of one-dimensional arrays of light detecting elements (e.g., 29 sets of 100×1 arrays of light detecting elements). Each set (e.g., 100×1 array) can correspond to a unique nondiffracting beam 110 in a one-dimensional array 111 of nondiffracting beams 110. In another example, the light detector 322 may be a two dimensional array of light detecting elements (e.g., 100×87 array of light detecting elements) that comprises sets of one-dimensional arrays of light detecting elements (e.g., 29 sets of 100×3 arrays of light detecting elements). Each set (e.g., 100×3 array) can correspond to a unique nondiffracting beam 110 in a one-dimensional array 111 of nondiffracting beams 110. In these two examples, the each set may receive light associated with the corresponding nondiffracting beam 110 and generate a signal with light data associated with the light received.

The light detector 322 generates one or more signals with light data associated with the light received by the light detecting elements in the light detector 322. Light data may include, for example, information about the properties of the light detected such as the intensity of the light, the wavelength(s) of the light, the frequency or frequencies of the light, the polarization(s) of the light, the phase(s) of the light, the spin angular momentum(s) of the light, and/or other light properties associated with the light received. Light data may also include the location of the light detecting element receiving the light.

In FIG. 4, the light detecting elements generate a signal with time varying light data as the object 200 moves in the fluid channel 330 and passes through the illuminating beams 330. Time varying light data refers to light data that is based on a time varying basis. In one example, the time varying data is in the form of line scans.

At any given time, the time varying data from the light detector 322 corresponds to a set of discrete transverse (X, Y) points (e.g., scatterers) on the object 200, with an extended depth (Z) range along the illumination paths of the nondiffracting beams 110. By moving the object 200 relative through the nondiffracting beams 110, while continuously acquiring time varying light data (e.g., line scans) from the light detector 322, the HRID 10 can acquire time varying light data from all transverse (X, Y) points of the sample with an extended depth (Z) range and thus acquire time varying light data from the sample volume with an object volume. In this way, the HRID 10 can acquire high-resolution two-dimensional images of an object 200 in the sample with a wide field of view and an extended depth of focus.

Although the body 300 in FIG. 4 has certain layers, other embodiments may integrate, omit, or add one or more layers or change the location of one or more layers in the body 300. For example, the body 300 may omit the filter layer 310. As another example, the body 300 may include a transparent protective layer (not shown) outside the filter layer 310 to isolate the filter layer 310 and/or the light detector 322. In yet another example or an embodiment using the projection imaging scheme, the body 300 may include a lens between the surface element 250 and the filter layer 310. In another example, the holographic element 140 and/or the surface element 250 may be separate from the body 300. In this example, one or more transparent layers may be used as surface layers to define the fluid channel 330.

The body 300 may be fabricated using standard semiconductor and micro/nanofabrication procedures. During an exemplary fabrication of an embodiment of the body 300, a filter layer 310 can be placed on top of the light detector layer 320. Then, then surface element 250 may be placed on top of the filter layer 310. The fluid channel 330 and holographic element 140 can then be placed on top of the surface element 250.

The processor 410 may include any suitable processor(s) (e.g., microprocessor) that can receive signals with light data from the light detector 322 associated with the light received by the light detector 322. The processor 410 can generate a high resolution two-dimensional image of the object 200 or a portion of the object 200 based on the light data received from the light detector 322. The processor 410 executes code stored on the CRM 420 to perform some of the functions of HRID 10 such as interpreting the light data from the light detector 322, performing analyses of the light data, and generating one or more images of the object 200 based on the light data.

The CRM (e.g., memory) 420 stores code for performing some functions of the HRID 10. The code is executable by the processor 410. In some embodiments, the CRM 420 may comprise: a) code for interpreting light data received from the light detector 322, b) code for generating one or more images of the object 200 based on non-time varying light data, c) code for determining the propagation angle of one or more nondiffracting beams 110, d) code for compiling line scans or other time varying light data into a two-dimensional image of the object based on the time varying light data, e) code for displaying the generated images, f) and/or any other suitable code for performing functions of the HRID 10. The CRM 420 may also include code for performing any of the signal processing or other software-related functions that may be created by those of ordinary skill in the art. The code may be in any suitable programming language including C, C++, Pascal, etc.

During operation of an optofluidic embodiment, a fluid, within which the object 200 is suspended, flows through the fluid channel 330. As the object 200 flows through the fluid channel 330, the object 200 alters (blocks, reduces intensity, modifies wavelength or other light property or spatial distribution) the light in the fluid channel 330. FIG. 4 shows the object 200 at a specific time as the object 200 moves through the array of nondiffracting beams 110.

In the illustrated embodiment, one or more light detecting elements in the light detector 322 receive light associated with a single nondiffracting beam 110. The light detecting elements receive light and generate time varying light data about the light as the object 200 moves through the fluid channel 330. The processor 410 receives a signal with time varying light data. The processor 410 uses the time varying light data to generate line scans associated with the y-locations of the light detecting elements. Each line scan is associated with a nondiffracting beam 110. The processor 410 can also use the light data to determine the rotation, velocity of the object 200, and changes in shape of the object 200. The time varying light data from the light detecting elements is based on the illumination through a volume of the object 150 illuminated by the nondiffracting beams 100. The processor 410 can reconstruct an image of the object 200 by appropriately shifting and assembling the line scans, and optionally other data such as rotation, velocity of the object 200, and changes in shape of the object 200, etc.

The HRID 100 can be used to generate any suitable type of image such as a fluorescence image, phosphorescence image, intensity images, phase image, differential interference contrast (DIC) image, etc. The images can be black and white images, grey tone images, color images, etc.

In one embodiment, the HRID 10 can generate a photoluminescence (e.g., fluorescence or phosphorescence) image of the object 200. In this embodiment, the filter layer 310 includes any suitable device(s) (e.g., optical filter) that can reject excitation light and pass emission light from the fluorophores. The illumination source 120 (e.g., laser) provides an excitation light having an excitation wavelength that can excite fluorophores in the object 200. The excited fluorophores emit an emission light. The light data measured by the light detector 322 is associated with the emission light from the fluorophores in the object 200. The processor 410 generates image data associated with the emission light data and generates a photoluminescence image of the object 200 based on the image data.

Modifications, additions, or omissions may be made to HRID 10 without departing from the scope of the disclosure. For example, the HRID 10 may omit the filter layer 132 in embodiments of the HRID 10 which do not perform photoluminescence imaging. As another example, other embodiments of the HRID 10 may include a display communicatively coupled to the processor 410 to receive output data such as image data and provide output such as an image or image data to a user of the HRID 10. In addition, the components of HRID 10 may be integrated or separated according to particular needs. For example, the processor 410 or other suitable processor may be integrated into the light detector 322 so that the light detector 322 can perform one or more of the functions of the processor 410 in some embodiments. As another example, the processor 410 and/or CRM 420 may be components of a computer, which is separate from the HRID 10 or a component of the HRID 10. As another example, the processor 410 and/or CRM 20 may be separate from the HRID 10.

D. Exemplary Operation of HRID

Figure 7:
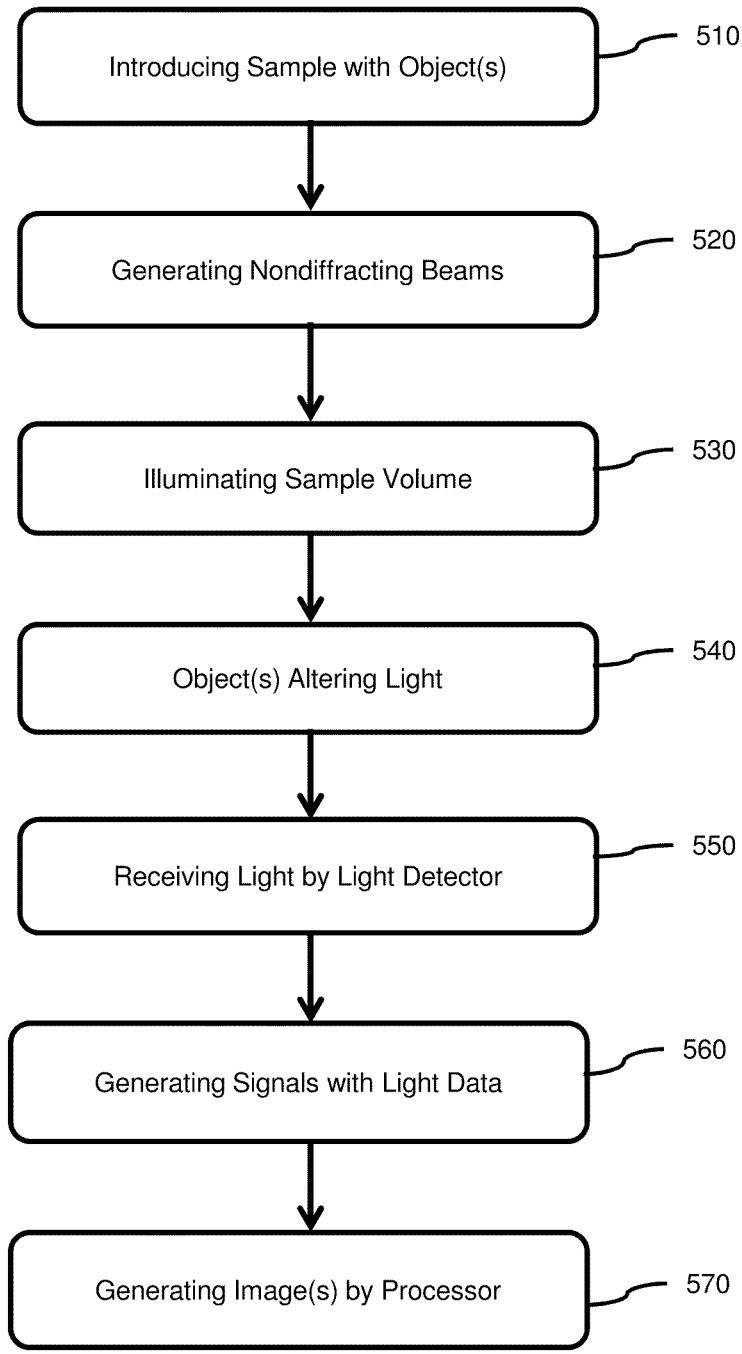
FIG. 7 is a flow chart of an exemplary method of imaging with the HRID, according to embodiments of the invention.

FIG. 7 is a flow chart of an exemplary method of imaging with the HRID 10, according to embodiments of the invention. In step 510, a sample (specimen) with one or more objects 200 is introduced into the HRID 10 using any suitable method. In an optofluidic embodiment, for example, the object 200 may be in a sample fluid injected into an input port of the fluid channel 300 (shown in FIG. 4) of the HRID 10. In another embodiment, the object 200 can be mounted or otherwise located on a removable surface element 250 (e.g., translation stage for providing the scanning for imaging), which is placed onto the body 300 of the HRID 10.

In step 520, a beam generator 100 creates a plurality of nondiffracting beams 110 that propagate through the one or more objects 200 while maintaining a constant spot size. The beam generator 100 can include any suitable device to generate the appropriate nondiffracting beams 110. For example, the beam generator 110 can include a holographic element 140 (e.g., CGH) that can generate the plurality of nondiffracting beams 110 upon being illuminated by the excitation beam 130 (e.g., plane wave excitation beam) from an illumination source 120 (e.g., laser). In other embodiments, other suitable devices can be used, as described in Section III.

To acquire an image of an object 200, the HRID 10 illuminates a volume of the sample (sample volume) including the one or more objects 200 being imaged. The HRID illuminates the sample volume using a scanning mechanism 430 (step 530). Any suitable scanning mechanism can be used. In some embodiments, the scanning mechanism 430 is a scanning device (e.g. raster scanner) that can scan the surface element 250 with the object 200 through the nondiffracting beams 110 or scan the nondiffracting beams 110 through a volume of the sample. In other embodiments, the scanning mechanism 430 can be a mechanism similar to the one used in optofluidic microscopy, where an image can be acquired by linear scanning. In these embodiments, the scanning mechanism 430 includes a fluid channel 330 having a fluid flow. The fluid flow carries a fluid specimen with the one or more objects 200 through an array of nondiffracting beams 110 diagonally located from one lateral side to the other lateral side of the fluid channel 330.

In step 540, the one or more objects 430 alter the light from the nondiffracting beams 110. In step 550, the light detector 322 receives light. The light is associated with the plurality of nondiffracting beams 110 as the scanning mechanism 430 moves the one or more objects 200 relative to the nondiffracting beams 110 or the nondiffracting beams 110 relative to the one or more objects 200. In a projection imaging embodiment, the HRID 10 includes a lens 302 between the light detector 322 and the surface element 250 that projects the light to the light detector 322. In a photoluminescence imaging embodiment, the filter 312 in the filter layer 310 blocks excitation light and passes emissions from fluorophores in the one or more object 200. In bright field imaging, the HRID 10 may not have a filter layer 310.

In step 560, the light detector 322 generates one or more signals with light data (e.g., time varying light data) associated with the light received, as the scanning mechanism 430 moves the plurality of nondiffracting beams 110 through the volume of the object 200 or moves the volume through the plurality of nondiffracting beams 110. At any given time during the scanning, the light data from the light detector 322 corresponds to a set of discrete transverse (X, Y) points on the object 200, with an extended depth (Z) range. That is, the light data corresponds to the illumination paths of the nondiffracting beams 110 which lie along z-directional lines at the set of discrete transvers (X, Y) points. By scanning, while continuously acquiring light data from the light detector 322, the HRID 10 is enabled to sample most to all transverse (X, Y) points in the sample volume and consequently be able to generate a continuous high-resolution two-dimensional image of the one or more objects 200 with a wide field of view and an extended depth of focus.

In step 570, the processor 410 receives the one or more signals with the light data from the light detector 322 and executes code on the CRM 420 to process the light data to generate one or more high resolution images of the one or more objects 200 with a wide field of view and an extended depth of focus. The HRID 100 can generate any suitable type of images such as a fluorescence images, phosphorescence images, intensity images, phase images, differential interference contrast (DIC) images, etc. The images can be black and white images, grey tone images, color images, etc.

In an optofluidic embodiment, the light data is time varying light data and the processor 410 uses the time varying light data to generate line scans associated with the y-locations of the light detecting elements. The processor 410 can also use the light data to determine the rotation, velocity of the object 200, and changes in shape of the object 200. Each line scan is associated with a nondiffracting beam 110. The time varying light data from the light detecting elements is based on the illumination through a volume of the object 150 illuminated by the nondiffracting beams 100. The processor 410 can reconstruct an image of the object 200 by appropriately shifting and assembling the line scans, and optionally other data such as rotation, velocity of the object 200, and changes in shape of the object 200, etc.

III. Beam Generators

The HRID 10 includes a beam generator 100 which can include any device or combination of any devices capable of generating the plurality of nondiffracting beams 110. Some examples of suitable device(s) in the beam generator 100 of embodiments may include: 1) a holographic element 140 (e.g., CGH) coupled to an illumination source 120 generating an excitation beam (e.g., plane wave excitation beam) 130, 2) one or more microaxicons, 3) one or more optical fibers, and 4) one or more optical fibers fitted with microaxicons. Although the first example is illustrated in FIGS. 1, 3 and 4, any suitable beam generating device can be included in other embodiments.

A. Holographic Element (e.g., CGH)

In some embodiments, the beam generator 100 may include a holographic element 140) coupled to an illumination source 120 generating an excitation beam (e.g., plane wave excitation beam) 130. The holographic element 140 may be, for example, a CGH. In some cases, such as the illustrated embodiments shown in FIGS. 1, 3, and 4, the holographic element 140 may be a custom designed CGH for generating a plurality of well separated nondiffracting beams 110, upon being illuminated by a plane wave excitation beam 130 (excitation beam). The custom-designed CGH) of these embodiments can be designed so that adjacent nondiffracting beams 110 are sufficiently separated to reduce or avoid crosstalk/multiplexing between beams, which can affect the quality of the nondiffracting beam illumination. The custom designed CGH (e.g., custom-designed CGH) can be designed to generate one or more nondiffracting beams 110 that do not diffract or only minimally diffracts within a limited region of space. The custom designed CGH can be computationally designed by interfering a conical wave front with a plane wave. The spot size and the focal plane of each nondiffracting beam 110 may be controlled by adjusting the width and the peak phase retardation of the conical wave front. By spatially shifting and summing these interference patterns, a series of Bessel beams can be generated. Depending on resolution requirements, the custom designed CGH can either be printed with grayscale graphics printers, with photoplotters as halftone images, or can be fabricated as chrome/iron oxide binary photomasks. An example of a custom-designed CGH can be found in "The generation of an array of nondiffracting beams by a single composite computer generated hologram," S H Tao et al 2005 J. Opt. A: Pure Appl. Opt. 7 40, which is hereby incorporated by reference in its entirety for all purposes. In this example, the CGH includes an N×N array of holograms, each hologram generating an individual Bessel beam. The CGH in this example can be used to generate a two-dimensional (N×N) array of Bessel beams. In this example, the holograms are designed to generate Bessel beams with sufficient separation to avoid crosstalk. Another example of a custom-designed CGH can be found in "Holographic generation of diffraction-free beams, Jari Turunen, Antti Vasara, and Ari T. Friberg, Appl. Opt. 27, 3959-3962 (1988)," S H Tao et al 2005 J. Opt. A: Pure Appl. Opt. 7 40, which is hereby incorporated by reference in its entirety for all purposes.

Figure 5:
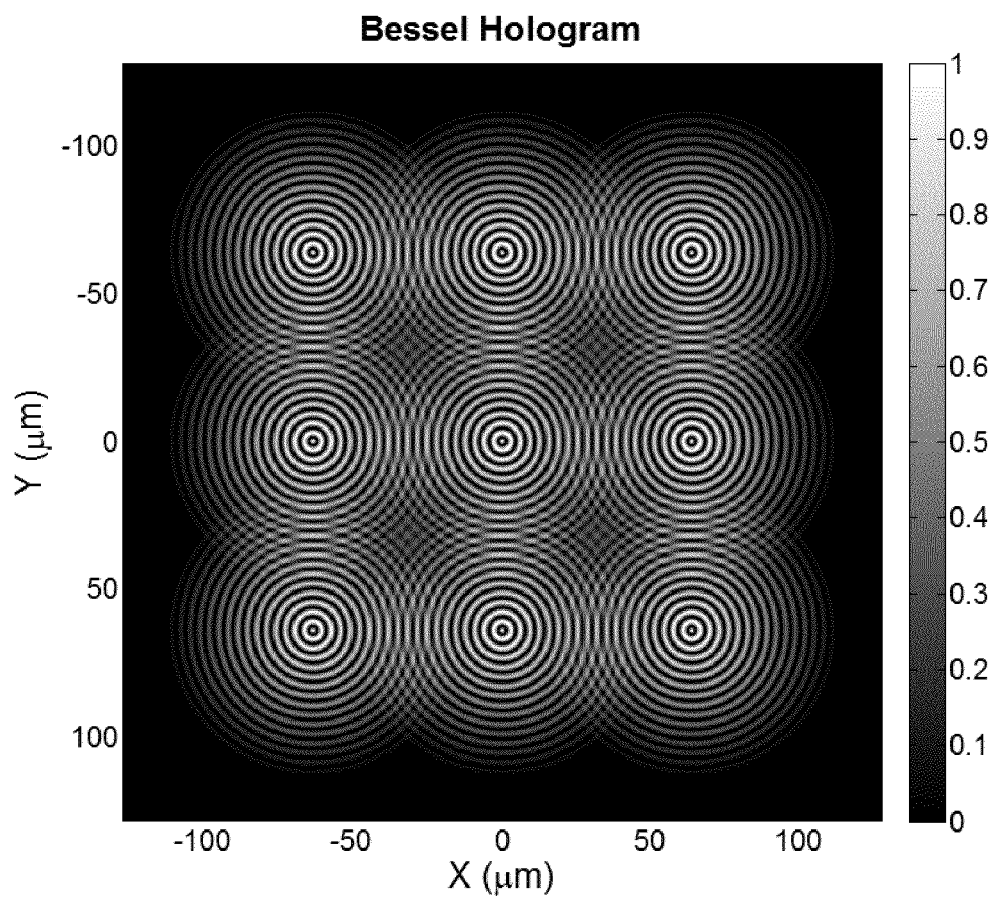
FIG. 5 is an illustration of an amplitude computer generated hologram (CGH) for generating nine nondiffracting beams, according to embodiments of the invention.
Figure 6:
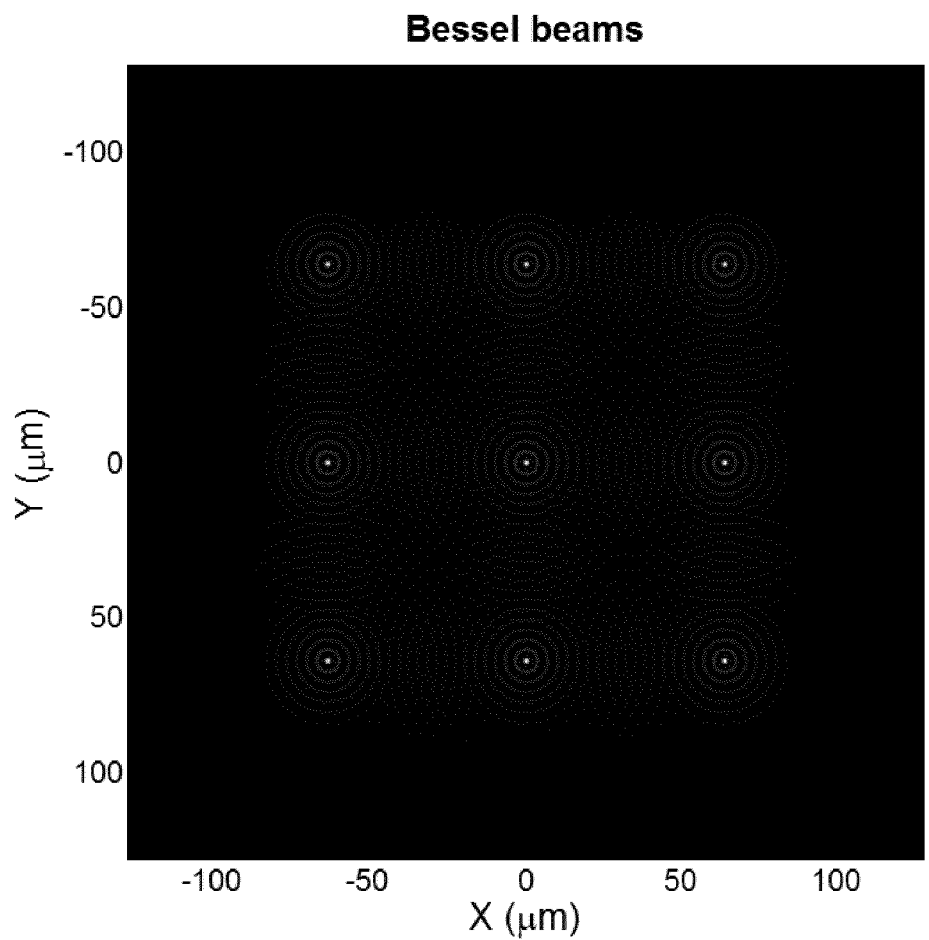
FIG. 6 is an illustration of the nine nondiffracting beams generated by the amplitude CGH shown in FIG. 5, according to embodiments of the invention.

FIG. 5 is an illustration of an amplitude CGH for generating nine nondiffracting beams 110, according to embodiments of the invention. The CGH illustrated in FIG. 5 is an example of a holographic element 140 of a beam generator 100 of embodiments. In FIG. 5, the CGH is shown to be able to generate nine nondiffracting beams 110 with the following parameters: spot size=1 µm, separation between beams=64 µm, CGH-focus distance=160 µm, and wavelength=0.5 µm. When illuminated with a spatially coherent excitation beam 130, the illustrated CGH can form nine nondiffracting beams 110 after an axial distance of 160 µm from it. FIG. 6 is an illustration of the nine nondiffracting beams 110 generated by the amplitude CGH shown in FIG. 5, according to embodiments of the invention.

Depending on resolution requirements, an amplitude CGH such as illustrated in FIG. 5, can either be printed with grayscale graphics printers, with photoplotters as halftone images, or can be fabricated as chrome/iron oxide binary photomasks. Typically, the printing resolution requirement scales with the desired resolution of the HRID 10. For example, to generate nondiffracting beams 110 with 1 µm spot size, the smallest feature size in our CGH is of the order of 1 µm. In this case, the resolution of printing technique used should be at least 1 µm. Such high resolution CGHs may be fabricated as binary chrome/iron oxide photo masks. While it may be expensive to fabricate the master chrome mask, copies of the master can be readily recorded either as optical holograms, or be duplicated using standard photolithography and/or photoreduction techniques.

B. Microaxicon(s)

In some embodiments, a beam generator 100 may include one or more microaxicons for generating the plurality of nondiffracting beams 110. In some cases, the beam generator 100 may include a two-dimensional microaxicon array. Each microaxicon can generate one or more nondiffracting beams. The fabrication of the two-dimensional microaxicon array can be implemented by multilayer lithography or etching processes. The efficiency of the microaxicon array can be better than a binary CGH since there may be no multiple diffraction in some embodiments. An example of a microaxicon that can generate one or more nondiffracting beams 110 can be found in "Nearly diffraction-limited focusing of a fiber axicon microlens," Sang-Kee Eah, Wonho Jhe, and Yasuhiko Arakawa, Rev. Sci. Instrum. 74, 4969 (2003).

C. Optical Fibers

In some embodiments, a beam generator 100 may include one or more optical fibers for generating the plurality of nondiffracting beams 110 in other embodiments. An example of a nondiffracting beam generator comprising a multimode optical fiber device can be found in "Generation of controllable nondiffracting beams using multimode optical fibers," Appl. Phys. Lett. 94, 201102 (2009), which is hereby incorporated by reference in its entirety for all purposes. In this example, the multimode optical fiber device includes a laser coupled to a single mode fiber which is coupled to a multimode fiber generating a nondiffracting beam.

D. Optical Fibers with Microaxicons

In some embodiments, a beam generator 100 may include optical fibers having microaxicons for generating the plurality of nondiffracting beams 110. An example of a beam generator comprising optical fibers having an axicon microlens can be found in "Nearly diffraction-limited focusing of a fiber axicon microlens," Sang-Kee Eah, Wonho Jhe, and Yasuhiko Arakawa, Rev. Sci. Instrum. 74, 4969 (2003), which is hereby incorporated by reference in its entirety for all purposes. In this example, the beam generator includes commercially available single-mode optical fibers. In this example, a microaxicon is fabricated in the end of each optical fiber by selective chemical etching method that allows fine control of the cone angle of the fiber. Light passing through each optical fiber passes through the microaxicon generating a nondiffracting beam and nearly diffraction-limited focused spot.

IV. Computer Devices

Figure 8:
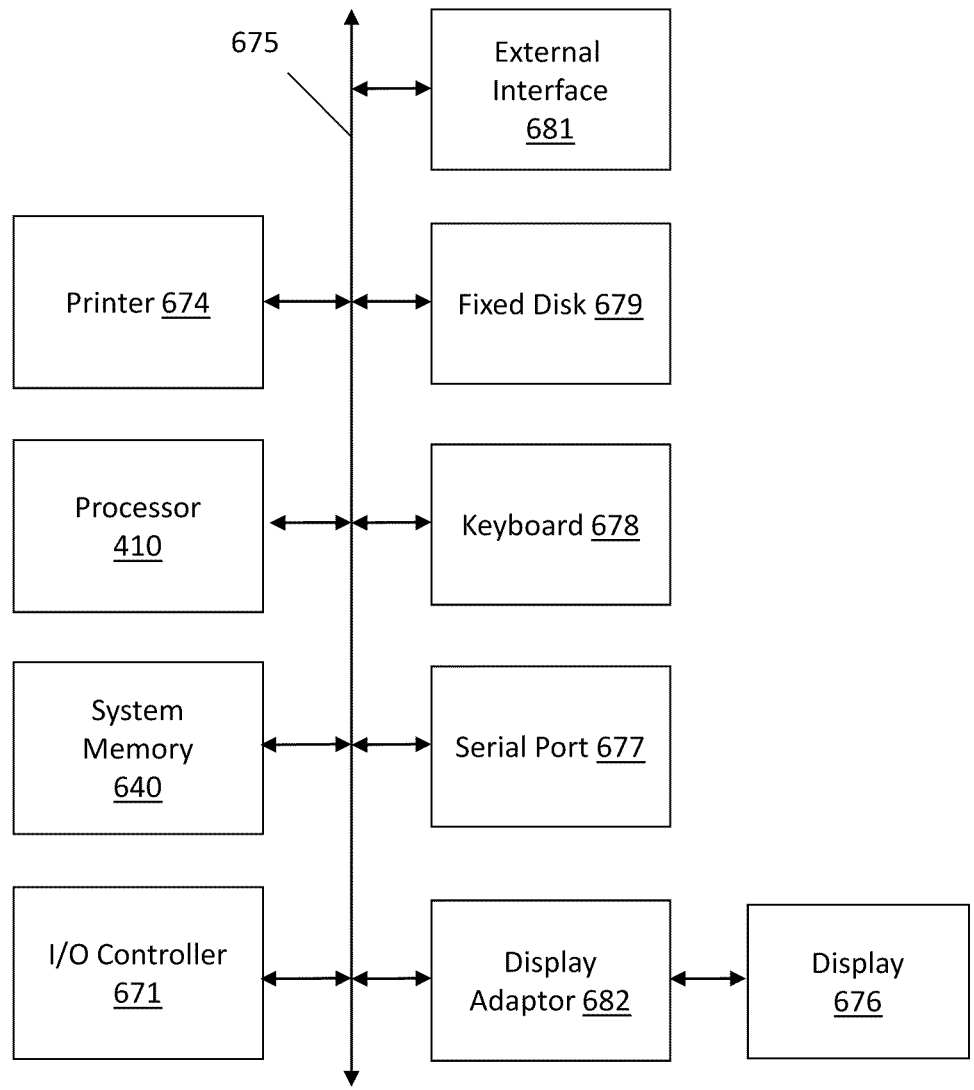
FIG. 8 is a block diagram of subsystems that may be present in the HRID, according to embodiments of the invention.

FIG. 8 is a block diagram of subsystems that may be present in the HRID 10, according to embodiments of the invention. For example, the HRID 10 includes a processor 410 for processing light data (e.g., time varying light data) and for generating high resolution two-dimensional images of an object 200 with a wide field of view an extended depth of focus. The processor 410 may be a component of the light detector 322, in some cases. In other embodiments, the HRID 10 may be in communication with a computer having one or more of the subsystems in FIG. 8.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 8. The subsystems shown in FIG. 8 are interconnected via a system bus 675. Additional subsystems such as a printer 674, keyboard 678, fixed disk 679 (or other memory comprising computer readable media), display 676, which is coupled to display adapter 682, and others are shown. Peripherals and input/output (I/O) devices, which couple to I/O controller 671, can be connected to the computer system by any number of means known in the art, such as serial port 677. For example, serial port 677 or external interface 681 can be used to connect the computer apparatus to a wide area network such as the Internet, a mouse input device, or a scanner. The interconnection via system bus allows the processor 410 to communicate with each subsystem and to control the execution of instructions from system memory 640 or the fixed disk 679, as well as the exchange of information between subsystems. The system memory 640 and/or the fixed disk 679 may embody a computer readable medium 420. Any of these elements may be present in the previously described features. A computer readable medium 420 according to an embodiment of the invention may comprise code for performing any of the functions described above.

In some embodiments, an output device such as the printer 684 or display 676 of the HRID 10 can output various forms of data. For example, the HRID 10 can output a bright-field image and/or a fluorescence image of an object 200 or other results of analysis.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A high resolution imaging device with wide field and extended focus, comprising:
   a body comprising a light detector layer outside a transparent surface element;
   a beam generator having a beam generator surface, the beam generator configured to generate a plurality of nondiffracting beams, each nondiffracting beam having a substantially constant spot size and a beam length, wherein each nondiffracting beam is configured to propagate imaging illumination along the beam length;
   a scanning mechanism for moving the plurality of nondiffracting beams through an object being imaged between the beam generator surface and the transparent surface element or moving the object through the plurality of nondiffracting beams in order to propagate the imaging illumination m lengths of the nondiffracting beams through a volume of the object;
   a light detector in the light detector layer, the light detector configured to receive light incident across the light detector layer and measure light data associated with the plurality of nondiffracting beams illuminating the volume of the object; and
   a processor configured to generate an image of the object based on the light data measured by the light detector, wherein the image is at a focal plane within the extended depth of focus defined by the beam lengths of the nondiffracting beams.

2. The high resolution imaging device with wide field and extended focus of claim 1, wherein the body further comprises a lens inside the light detector layer, the lens configured to focus light on a light detector surface of the light detector layer.

3. The high resolution imaging device with wide field and extended focus of claim 2, wherein the lens is located so that the focal plane of the lens is halfway through the length of the nondiffracting beams.

4. The high resolution imaging device with wide field and extended focus of claim 2, wherein the lens has a numerical aperture smaller than the plurality of nondiffracting beams.

5. The high resolution imaging device with wide field and extended focus of claim 1, wherein the transparent surface element is a transparent platform holding the object.

6. The high resolution imaging device with wide field and extended focus of claim 1, wherein the body further comprises a filter layer between the light detector layer and the transparent surface element, the filter layer having a filter for passing emissions.

7. The high resolution imaging device with wide field and extended focus of claim 1, wherein the light detector comprises a two-dimensional array of light detecting elements comprising sets of light detecting elements, each set uniquely corresponding to a nondiffracting beam of the plurality of nondiffracting beams.

8. The high resolution imaging device with wide field and extended focus of claim 1, wherein the beam generator comprises a computer generated hologram and an illumination source providing an excitation beam to the computer generated hologram, the computer generated hologram configured to transform the excitation beam into the plurality of nondiffracting beams.

9. The high resolution imaging device with wide field and extended focus of claim 1, wherein the scanning mechanism is a scanner coupled to the beam generator for moving the beam generator relative to the object.

10. The high resolution imaging device with wide field and extended focus of claim 1, wherein the scanning mechanism is a scanner coupled to the transparent surface element holding the object, wherein the scanning mechanism is configured to move the object relative to the nondiffracting beams.

11. A high resolution optofluidic imaging device with wide field and extended focus, comprising:
  a beam generator having a beam generator surface, the beam generator configured to generate a plurality of nondiffracting beams, each nondiffracting beam having a substantially constant spot size and a beam length, wherein each nondiffracting beam is configured to propagate imaging illumination along the beam length; and
  a body comprising:
    a fluid channel having a first channel surface and a second channel surface, the fluid channel having a flow moving an object through the nondiffracting beams propagating imaging illumination through the fluid channel,
    a transparent surface layer located outside the first channel surface, and
    a light detector layer located outside the transparent surface layer, the light detector layer comprising a light detector, the light detector configured to receive light incident across the light detector layer and configured to measure time varying light data associated with illumination from the plurality of nondiffracting beams as the object moves through the fluid channel, and
  a processor configured to generate an image of the object based on the measured time varying light data measured by the light detector, wherein the image is at a focal plane within the extended depth of focus defined by the beam lengths of the nondiffracting beams.

12. The high resolution optofluidic imaging device with wide field and extended focus of claim 11, wherein the processor is further configured to generate line scans from the time varying light data.

13. The high resolution optofluidic imaging device with wide field and extended focus of claim 11, wherein the body further comprises a lens inside of the light detector layer, the lens configured to focus light on the light detector surface.

14. The high resolution optofluidic imaging device with wide field and extended focus of claim 13, wherein the lens is located so that the focal plane of the lens is half way through the depth of the fluid channel.

15. The high resolution optofluidic imaging device with wide field and extended focus of claim 13, wherein the lens has a numerical aperture smaller than the plurality of nondiffracting beams.

16. The high resolution optofluidic imaging device with wide field and extended focus of claim 11, wherein the body further comprises a filter layer between the light detector layer and the transparent surface layer, the filter layer having a filter for passing emissions.

17. The high resolution optofluidic imaging device with wide field and extended focus of claim 11, wherein the light detector comprises a two-dimensional array of light detecting elements comprising sets of light detecting elements, each set uniquely corresponding to a nondiffracting beam of the plurality of nondiffracting beams.

18. The high resolution optofluidic imaging device with wide field and extended focus of claim 11, wherein the beam generator comprises a computer generated hologram and an illumination source providing an excitation beam to the computer generated hologram, the computer generated hologram configured to transform the excitation beam into the plurality of nondiffracting beams.

19. The high resolution imaging device with wide field and extended focus of claim 1,
  wherein the nondiffracting beams propagate through the thickness of the object and over an area corresponding to the wide field of the high resolution imaging device; and
  wherein the nondiffracting beams have a length associated with an extended focal range of the extended focus of the high resolution imaging device.

20. The high resolution imaging device with wide field and extended focus of claim 1, wherein the plurality of nondiffracting beams is in the form of a two-dimensional array of Bessel beams.

21. The high resolution imaging device with wide field and extended focus of claim 1, wherein the beam length is at least about 250 microns.

22. The high resolution imaging device with wide field and extended focus of claim 1, wherein the resolution of the high resolution imaging device is based on the substantially constant spot size of the nondiffracting beams, wherein the substantially constant spot size less than a micron.

* * * * *